(12) United States Patent
Ota et al.

(10) Patent No.: US 8,583,335 B2
(45) Date of Patent: Nov. 12, 2013

(54) CONTROL DEVICE FOR VEHICULAR DRIVE APPARATUS

(75) Inventors: Hirofumi Ota, Toyota (JP); Koichi Miyamoto, Nagoya (JP); Shingo Eto, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 104 days.

(21) Appl. No.: 12/922,009

(22) PCT Filed: Feb. 6, 2009

(86) PCT No.: PCT/JP2009/052111
§ 371 (c)(1),
(2), (4) Date: Sep. 10, 2010

(87) PCT Pub. No.: WO2009/113347
PCT Pub. Date: Sep. 17, 2009

(65) Prior Publication Data
US 2011/0010063 A1 Jan. 13, 2011

(30) Foreign Application Priority Data
Mar. 13, 2008 (JP) ................................ 2008-064387

(51) Int. Cl.
*G06F 7/00* (2006.01)
*B60W 10/02* (2006.01)
*B60W 10/08* (2006.01)

(52) U.S. Cl.
CPC *G06F 7/00* (2013.01); *B60W 10/02* (2013.01); *B60W 10/08* (2013.01)
USPC .................. 701/58; 701/51; 477/5

(58) Field of Classification Search
USPC ....... 701/58; 180/247; 318/139, 52; 303/151, 303/152, 113.4
See application file for complete search history.

(56) References Cited

U.S. PATENT DOCUMENTS
3,886,729 A 6/1975 Amann et al.
(Continued)

FOREIGN PATENT DOCUMENTS
JP 50-50509 A 5/1975
JP 57-44252 U 3/1982
(Continued)

OTHER PUBLICATIONS
International Search Report for PCT/JP2009/052111, dated Mar. 3, 2009.
U.S. Office Action dated Jul. 19, 2013 issued in corresponding U.S. Appl. No. 12/922,059.

Primary Examiner — Thomas Tarcza
Assistant Examiner — Tyler J Lee
(74) Attorney, Agent, or Firm — Sughrue Mion, PLLC

(57) ABSTRACT

A control device for a vehicular drive apparatus, includes: a torque converter having a pump wheel, a turbine wheel and a stator wheel rotatably disposed between the turbine wheel and the pump wheel; an electric motor operative to drive and/or apply a brake to the stator wheel; a first connecting/disconnecting means operable to connect/disconnect the electric motor and the stator wheel to and from each other; a second connecting/disconnecting means operable to connect/disconnect the electric motor and an output shaft to and from each other; and mode switching means for switching a first mode in which the first connecting/disconnecting means is held in a connecting state to allow the electric motor to control a rotating state of the stator wheel and a second mode in which the second connecting/disconnecting means is held in a connecting state to enable the electric motor to perform power running and regeneration, depending on a running condition of a vehicle.

13 Claims, 11 Drawing Sheets

(56) References Cited

U.S. PATENT DOCUMENTS

| | | | |
|---|---|---|---|
| 5,415,603 A * | 5/1995 | Tuzuki et al. | 477/5 |
| 6,050,375 A | 4/2000 | Gradu et al. | |
| 7,016,773 B2 * | 3/2006 | Kuroda et al. | 701/22 |
| 7,676,313 B2 * | 3/2010 | Ortmann et al. | 701/64 |
| 2011/0005215 A1 | 1/2011 | Ota et al. | |
| 2011/0010063 A1 | 1/2011 | Ota et al. | |

FOREIGN PATENT DOCUMENTS

| | | |
|---|---|---|
| JP | 1-169170 A | 7/1989 |
| JP | 2-145353 U | 12/1990 |
| JP | 10-339363 A | 12/1998 |

* cited by examiner

FIG.1
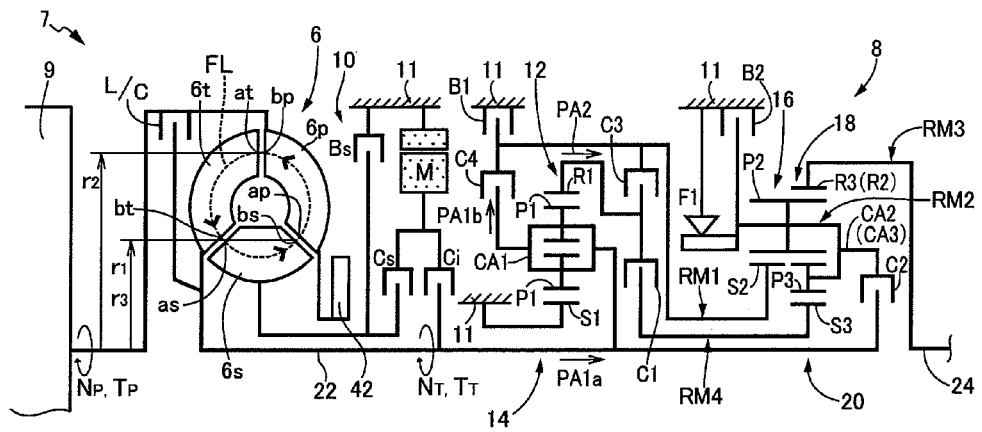
FIG.2
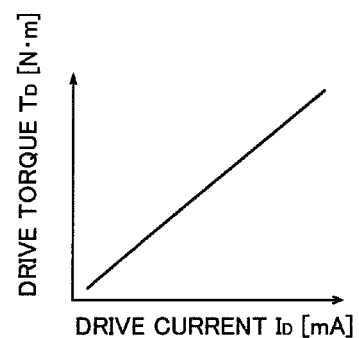
(a)
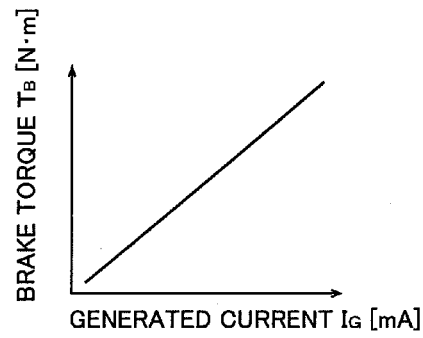
(b)

|      | C1 | C2 | C3 | C4 | B1 | B2 | F1 |
|------|----|----|----|----|----|----|----|
| P    |    |    |    |    |    |    |    |
| Rev1 |    |    | O  |    |    | O  |    |
| Rev2 |    |    |    | O  |    | O  |    |
| N    |    |    |    |    |    |    |    |
| 1st  | O  |    |    |    |    | (O)| O  |
| 2nd  | O  |    |    | O  |    |    |    |
| 3rd  | O  |    | O  |    |    |    |    |
| 4th  | O  |    |    | O  |    |    |    |
| 5th  | O  | O  |    |    |    |    |    |
| 6th  |    | O  |    | O  |    |    |    |
| 7th  |    | O  | O  |    |    |    |    |
| 8th  |    | O  |    |    |    | O  |    |

O : ENGAGING STATE    (O) : ENGAGING STATE ONLY DURING ENGINE BRAKING

|  | Cs | Ci | Bs |
|---|---|---|---|
| FIRST MODE | ○ | ○ |  |
| SECOND MODE |  | ○ | ○ |
| THIRD MODE | ◎ |  | ○ |
| THIRD MODE | ○ |  | ◎ |

CONTROL DEVICE FOR VEHICULAR DRIVE APPARATUS

CROSS REFERENCE TO RELATED APPLICATIONS

This application is a National Stage of International Application No. PCT/JP2009/052111 filed Feb. 6, 2009, claiming priority based on Japanese Patent Application No. 2008-064387, filed Mar. 13, 2008, the contents of all of which are incorporated herein by reference in their entirety.

TECHNICAL FIELD

The present invention relates to a vehicular drive apparatus provided with torque converter, which can multiply torque by means of fluid and, more particularly, to a control device for a vehicular drive apparatus incorporating a torque converter that can alter a torque multiplying rate with the use of an electric motor.

BACKGROUND ART

A torque converter has heretofore been known as having a pump wheel, a turbine wheel and a stator wheel rotatably disposed between the turbine wheel and the pump wheel. With the torque converter of such a related art, the stator wheel is connected to a non-rotating member via a one-way clutch with no provision of variable displacement characteristic. In general, the torque converter has a fluid characteristic that needs to have a high capacity (capacity coefficient) with high directivity for fuel consumption. With such a related art structure, the fluid characteristic is uniquely determined with shapes of the pump wheel, the turbine wheel and the stator wheel. Therefore, the torque converter exhibits identical fluid characteristics regardless of running patterns, resulting in limitations in improving fuel economy performance and power performance at once.

As disclosed in Patent Publication 1, on the contrary, a proposal has been made to provide a variable displacement type torque converter with a structure incorporating brake means between the turbine wheel and the non-rotating member, under which brake torque of the braking means is adjusted to allow the capacity to be variable. With such a structure, adjusting brake torque of the braking means results in a capability of varying a torque ratio and a capacity coefficient of the torque converter in a continuously variable mode or in a multi-stage mode. This enables an optimum torque ratio and capacity coefficient to be determined depending on a driving condition and a running condition, resulting in an increase in running performance of a vehicle.

[Patent Publication 1] Japanese Patent Application Publication No. 1-169170

With the variable displacement type torque converter of such a related art, however, the stator wheel was merely controlled in rotation within a range of a negative rotating direction opposite to a rotating direction of the pump wheel, resulting in limitations in an upper limit value of torque ratios and a lower limit value of the capacity coefficient that could be obtained with such a structure. Accordingly, the torque ratio of the torque converter could not be necessarily and adequately increased to vary the capacity coefficient to a lower level depending on the driving condition and the running condition, resulting in a difficulty of adequately increasing power performance of the vehicle.

SUMMARY OF THE INVENTION

The present invention has been completed with the above views in mind and has an object to provide a control device for a vehicular drive apparatus incorporating a variable displacement type torque converter that can increase a torque ratio and vary a capacity coefficient to a lower level while adequately enabling an increase in power performance of a vehicle.

Upon various studies conducted by the present inventors in the context of the above views, it turns out that actively driving the stator wheel in a positive rotating direction in agreement with the rotating direction of the pump wheel upon using an electric motor, provided as a drive-force source independently of a drive-force source of the vehicle, results in a capability of obtaining a higher torque ratio and a lower capacity coefficient than those of the related art. Thus, the stator wheel is rotated (driven) in the positive rotating direction in agreement with the rotating direction of the pump wheel and rotated (braked and regenerated) in a negative rotating direction opposite to the rotating direction of the pump wheel upon using the electric motor. This allows the stator wheel to have wider varying ranges in torque ratio and capacity coefficient than those of the related art, thereby enabling the vehicle to have remarkably improved fuel economy performance and power performance.

Further, another method is found out by the present inventors in which using the electric motor, acting as the drive-force source to drive the stator wheel, not only as a motor to drive the stator wheel but also as a motor for driving and braking (regenerating) the vehicle. To this end, means for connecting/disconnecting the electric motor and the stator wheel and means for connecting/disconnecting the electric motor and an output shaft are provided to allow these component elements to be connected/disconnected to and from one another depending on the running condition of the vehicle with resultant further increases in fuel economy performance and power performance of the vehicle.

The object indicated above may be achieved according to a first aspect of the invention, which provides a control device for a vehicular drive apparatus, including: a torque converter having a pump wheel, a turbine wheel and a stator wheel rotatably disposed between the turbine wheel and the pump wheel; an electric motor operative to drive and/or apply a brake to the stator wheel; a first connecting/disconnecting means operable to connect/disconnect the electric motor and the stator wheel to and from each other; a second connecting/disconnecting means operable to connect/disconnect the electric motor and an output shaft to and from each other; and mode switching means for switching a first mode in which the first connecting/disconnecting means is held in a connecting state to allow the electric motor to control a rotating state of the stator wheel and a second mode in which the second connecting/disconnecting means is held in a connecting state to enable the electric motor to perform power running and regeneration, depending on a running condition of a vehicle.

The object indicated above may be achieved according to a second aspect of the invention, which provides the control device for the vehicular drive apparatus according to the first aspect, wherein the mode switching means switches the modes to either one of the first and second modes depending on an allowable rotation speed of the electric motor.

The object indicated above may be achieved according to a third aspect of the invention, which provides the control device for the vehicular drive apparatus according to the second aspect, wherein the mode switching means switches the modes to the first mode when a rotation speed of the turbine wheel is higher than the allowable rotation speed of the electric motor.

The object indicated above may be achieved according to a fourth aspect of the invention, which provides the control device for the vehicular drive apparatus according to the second aspect, wherein the mode switching means switches the modes to the second mode when a rotation speed of the turbine wheel is lower than the allowable rotation speed of the electric motor.

The object indicated above may be achieved according to a fifth aspect of the invention, which provides the control device for the vehicular drive apparatus according to the first aspect, wherein the mode switching means switches the modes to either one of the first and second modes depending on a demanded drive force of the vehicle.

The object indicated above may be achieved according to a sixth aspect of the invention, which provides the control device for the vehicular drive apparatus according to the fifth aspect, wherein the mode switching means switches the modes to either one of the first and second modes based on a comparison between the demanded drive force of the vehicle and an output of the electric motor.

The object indicated above may be achieved according to a seventh aspect of the invention, which provides the control device for the vehicular drive apparatus according to the sixth aspect, further including: fuel consumption-amount calculating means for calculating fuel consumption amounts for the first and second modes to be switched, respectively; and fuel consumption-amount comparing means for comparing the fuel consumption amounts in magnitude relation; wherein when the demanded drive force of the vehicle is greater than the output of the electric motor, the mode switching means switches the modes to a mode involved in a lower fuel consumption amount determined by the fuel consumption-amount comparing means.

The object indicated above may be achieved according to a eighth aspect of the invention, which provides the control device for the vehicular drive apparatus according to the sixth aspect, wherein when the demanded drive force of the vehicle is less than the output of the electric motor, the mode switching means switches the modes to the second mode.

The object indicated above may be achieved according to a ninth aspect of the invention, which provides the control device for the vehicular drive apparatus according to the first aspect, wherein the mode switching means switches the modes to either one of the first and second modes depending on a state of charge of a battery from which electric power is supplied to the electric motor.

The object indicated above may be achieved according to a tenth aspect of the invention, which provides the control device for the vehicular drive apparatus according to the ninth aspect, wherein: when the state of charge of the battery is less than a given threshold value;
the mode switching means switches the modes to either one of the first and second modes depending on an engaging state of a lock-up clutch provided in the torque converter.

The object indicated above may be achieved according to a eleventh aspect of the invention, which provides the control device for the vehicular drive apparatus according to the ninth aspect, further including: an electric-motor operating time calculating means for calculating operating times of the electric motor for the first and second modes to be switched; and an electric-motor operating time comparing means for making a comparison between the operating times in magnitude relation; wherein when the state of charge of the battery is larger than a given threshold value, the mode switching means switches the modes to an appropriate mode based on the comparison between the operating times of the electric motor.

The object indicated above may be achieved according to a twelfth aspect of the invention, which provides the control device for the vehicular drive apparatus according to any one of the first to eleventh aspects, further including: third connecting/disconnecting means operable to connect/disconnect the stator wheel and a fixed member to and from each other; wherein the mode switching means switches the modes further to a third mode in which the third connecting/disconnecting means is held in a connecting state to allow the stator wheel to be placed in a halted condition, depending on the running condition of the vehicle.

The object indicated above may be achieved according to a thirteenth aspect of the invention, which provides the control device for the vehicular drive apparatus according to the twelfth aspect, wherein: a planetary gear set is interposed between the torque converter and the electric motor; and the planetary gear set includes three rotary elements in the form of a first rotary element, a second rotary element and a third rotary element; wherein the first rotary element is connected to the stator wheel via the first connecting/disconnecting means; the first rotary element is connected to the fixed member via the third connecting/disconnecting means; the second rotary element is connected to the output shaft via the second connecting/disconnecting means; and the third rotary element is connected to the electric motor.

According to the first aspect of the invention, the control device includes a torque converter having a pump wheel, a turbine wheel and a stator wheel rotatably disposed between the turbine wheel and the pump wheel; and an electric motor operative to drive and/or apply a brake to the stator wheel. Accordingly, the stator wheel is caused to rotate in the positive rotating direction in agreement with the rotating direction of the pump wheel by using the electric motor while caused to rotate in the negative rotating direction opposite to the rotating direction of the pump wheel. This allows the stator wheel to vary the torque ratio and capacity coefficient in wider varying ranges than those of the related art. Thus, the vehicle can have remarkably improved fuel economy performance and power performance.

The control device includes mode switching means for switching a first mode in which the first connecting/disconnecting means is held in a connecting state to allow the electric motor to control a rotating state of the stator wheel and a second mode in which the second connecting/disconnecting means is held in a connecting state to enable the electric motor to perform power running and regeneration, depending on a running condition of a vehicle. This enables the mode to be appropriately switched to the first mode or the second mode depending on the running condition of the vehicle. Thus, a favorable control can be achieved depending on the mode, enabling the vehicle to have remarkably improved fuel economy performance and power performance.

According to the second aspect of the invention, the mode switching means switches the modes to either one of the first and second modes depending on an allowable rotation speed of the electric motor. Therefore, calculating the allowable rotation speed of the electric motor allows the modes to be appropriately switched, enabling the vehicle to have remarkably improved fuel economy performance and power performance.

According to the third aspect of the invention, the mode switching means switches the modes to the first mode when a rotation speed of the turbine wheel is higher than the allowable rotation speed of the electric motor. This enables variable displacement control of the torque converter to be performed. This can aid (assist) the drive force of the vehicle by means of the torque converter in variable displacement. In addition, connecting the electric motor at a high rotating speed of the turbine wheel avoids the electric motor from rotating at an overspeed.

According to the fourth aspect of the invention, the mode switching means switches the modes to the second mode when a rotation speed of the turbine wheel is lower than the allowable rotation speed of the electric motor. This enables the electric motor to directly drive or apply a brake (regeneration) on the vehicle. Also, such a direct drive with the electric motor may involve a so-called assist run in which the vehicle is propelled with a drive force of a drive-force source and a drive force of the electric motor.

According to the fifth aspect of the invention, the mode switching means switches the modes to either one of the first and second modes depending on a demanded drive force of the vehicle. Therefore, calculating the demanded drive force of the vehicle allows an appropriate mode to be selected, enabling the vehicle to have remarkably improved fuel economy performance and power performance.

According to the sixth aspect of the invention, the mode switching means switches the modes to either one of the first and second modes based on a comparison between the demanded drive force of the vehicle and an output of the electric motor. This enables an appropriate mode to be selected in conformity to performance of the electric motor.

According to the seventh aspect of the invention, when the demanded drive force of the vehicle is greater than the output of the electric motor, the mode switching means switches the modes to a mode involved in a lower fuel consumption amount determined by the fuel consumption-amount comparing means. This enables the vehicle to have improved fuel economy performance.

According to the eighth aspect of the invention, when the demanded drive force of the vehicle is less than the output of the electric motor, the mode switching means switches the modes to the second mode. This enables the electric motor to directly drive the vehicle (including the assist run).

According to the ninth aspect of the invention, the mode switching means switches the modes to either one of the first and second modes depending on a state of charge of a battery from which electric power is supplied to the electric motor. Therefore, detecting the state of charge of the battery allows the modes to be appropriately switched, enabling the vehicle to have remarkably improved fuel economy performance and power performance.

According to the tenth aspect of the invention, when the state of charge of the battery is less than a given threshold value, the mode switching means switches the modes to either one of the first and second modes depending on an engaging state of a lock-up clutch provided in the torque converter. This enables the vehicle to run in an appropriate mode. For instance, if the lock-up clutch remained engaged, switching the mode to the second mode enables the power-generation control to be performed with the output shaft, enabling the state of charge to be improved. In addition, with the lock-up clutch remained disengaged, the stator wheel is enabled to perform the power-generation control such that the state of charge is improved.

According to the eleventh aspect of the invention, the control device includes an electric-motor operating time calculating means for calculating operating times of the electric motor for the first and second modes to be switched; and an electric-motor operating time comparing means for making a comparison between the operating times in magnitude relation; and when the state of charge of the battery is larger than a given threshold value, the mode switching means switches the modes to an appropriate mode based on the comparison between the operating times of the electric motor. Thus, the vehicle can be caused to run in an appropriate mode. During, for instance, the second mode, if the operating time for the electrical run mode with the use of only the electric motor exceeds the given threshold value, the mode is switched to the electrical run mode. In addition, the relevant operation start times for the first and second modes are compared to each other, upon which the mode is switched to a mode involved in a long operation time.

According to the twelfth aspect of the invention, the mode switching means switches the modes further to a third mode in which the third connecting/disconnecting means is held in a connecting state to allow the stator wheel to be placed in a halted condition, depending on the running condition of the vehicle. Therefore, if the mode is switched to the third mode, the stator wheel is brought into a non-rotating state. Thus, suitably switching the mode to the third mode enables the torque converter to operate like the torque converter of the related art. With the torque converter placed in, for instance, a torque converting range, the third connecting/disconnecting means is brought into a connected state to halt the stator wheel in rotation, thereby increasing a torque ratio. With the torque converter placed in, for instance, a coupling range, the third connecting/disconnecting means is brought into a disconnected state such that the stator wheel is caused to freewheel.

According to the thirteenth aspect of the invention, a planetary gear set is interposed and each element of the planetary gear set is connected described above. This allows the output torque of the electric motor to be subjected to torque conversion by means of the planetary gear set. This enables the electric motor to be further miniaturized in structure.

BRIEF DESCRIPTION OF THE DRAWINGS

FIG. 1 is a skeleton view of a vehicular drive apparatus to which a torque converter (variable displacement type torque converter) of one embodiment according to the present invention is applied.

FIGS. 2(a) and (b) are views showing the relationships between an electric motor and a drive current and a generated current.

BEST MODE FOR CARRYING OUT THE INVENTION

Figures 3, 4:
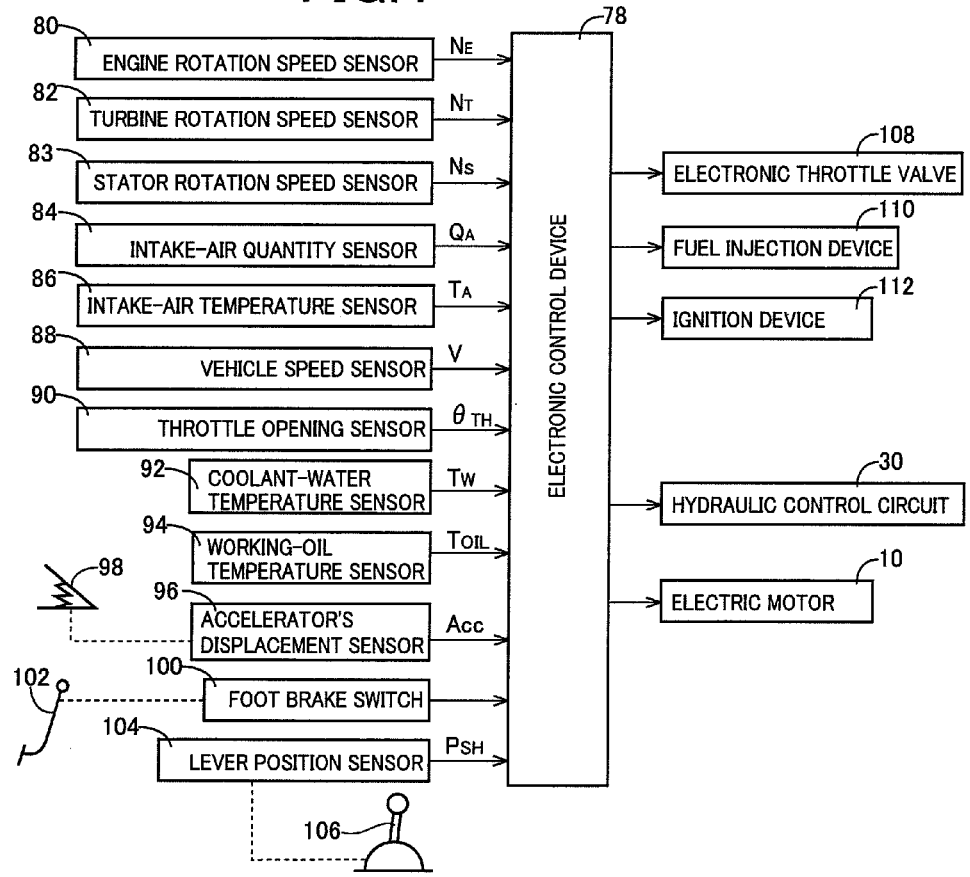
FIG. 3 is a table illustrating operating states of various engaging elements for various gear positions to be established in an automatic transmission.
FIG. 4 is a block diagram illustrating a control system incorporated in a vehicle for controlling an engine, the automatic transmission and the torque converter shown in FIG. 1.

Now, various embodiments of the present invention will be described below in detail with reference to the accompanying drawings.

Embodiment 1

FIG. 1 is a skeleton view of a vehicular drive apparatus 7 to which a torque converter 6 (variable displacement type torque converter) of one embodiment according to the present invention is applied. The vehicular drive apparatus 7 is of the type, including an automatic transmission 8 of a longitudinal layout and preferably applied to an FR (front engine rear drive), which includes an engine 9 as a drive-force source for run. The engine 9, comprised of an internal combustion engine, provides an output that is transferred through the torque converter 6 functioning as a hydraulic power transfer device, the automatic transmission 8, a differential gear device (final speed reduction gear) that is not shown, and a pair of axles, etc., to left and right drive wheels.

The torque converter 6 includes a pump wheel 6p connected to a crankshaft of the engine 9 to be rotatably driven by the engine 9 to generate a fluid flow due to working oil flowing through the torque converter 6, a turbine wheel 6t connected to an input shaft 22 of the automatic transmission 8 to be rotated upon receipt of the fluid flow delivered from the pump wheel 6p, and a stator wheel 6s rotatably disposed in a fluid stream delivered from the turbine wheel 6t to the pump wheel 6p. Thus, the torque converter 6 is arranged to perform a power transfer by means of working oil (fluid).

Further, a lock-up clutch L/C is interposed between the pump wheel 6p and the turbine wheel 6t to allow a hydraulic control circuit 30, described later, to controllably place the lock-up clutch L/C in an engaging state, a slipping state or a disengaging state. With the lock-up clutch L/C placed in a completely engaging state, the pump wheel 6p and the turbine wheel 6t are caused to unitarily rotate, i.e., in a direct connection between the crankshaft of the engine 9 and the input shaft 22.

Furthermore, the vehicular drive apparatus 7 includes an electric motor (motor) 10 for rotatably driving the stator wheel 6s of the torque converter 6, a clutch Cs operable to connect/disconnect the electric motor 10 and the stator wheel 6s to and from each other, a brake Bs operable to provide connection/disconnection between the stator wheel 6s and a transmission case (hereinafter referred to as a "case") 11 serving as a fixed member, and a clutch Ci operable to connect/disconnect the electric motor 10 and the input shaft 22 to and from each other. Moreover, the clutch Cs of the present embodiment corresponds to first connecting/disconnecting means of the present invention; the brake Bs corresponds to third connecting/disconnecting means of the present embodiment; and the clutch Ci corresponds to second connecting/disconnecting means of the present embodiment. The input shaft performs as an output shaft of the torque converter 6 and corresponds to an output shaft of the present invention.

With the clutch Cs caused to engage, the electric motor 10 drives the stator wheel 6s so as to control a revolution of the stator wheel 6s in a positive rotating direction in agreement with a rotating direction of the pump wheel 6p. In this moment, the stator wheel 6s is applied with drive torque $T_D$ to rotate in the positive rotating direction at a rate proportionate to the magnitude of a drive current $I_D$ supplied to the electric motor 10 from an electronic control circuit 78 for rotatably driving the same in a manner, for instance, as shown in FIG. 2 (a) as will be described below. Further, the electric motor 10 drives the stator wheel 6s so as to control the revolution of the stator wheel 6s in the negative rotating direction. During such control, the stator wheel 6s is applied with drive torque $T_D$ to rotate in the negative rotating direction at a rate proportionate to the magnitude of, for instance, the drive current $I_D$ supplied to the electric motor 10 from the electronic control device 78. Moreover, the electric motor 10 corresponds to a motor of the present invention.

Further, the electric motor 10 is also arranged to control the revolution of the stator wheel 6s in the negative rotating direction opposite to the rotating direction of the pump wheel 6p by means of a brake (regenerative) effect. During such control, the stator wheel 6s is applied with load torque, i.e., brake torque $T_B$, in the negative rotating direction at a rate proportionate to the magnitude of, for instance, a generated current $I_G$ supplied to or stored in a battery or the like mounted on, for instance, a vehicle in a manner as shown in FIG. 2 (b).

With the clutch Ci caused to engage, moreover, the electric motor 10 drives the input shaft 22 so as to control a revolution of the input shaft 22 in a positive rotating direction in agreement with a rotating direction of the input shaft 22. Even during such control, the input shaft 22 is applied with drive torque $T_D$ in the positive rotating direction at a rate proportionate to the magnitude of the drive current $I_D$ supplied to the electric motor 10 from the electronic control circuit for rotatably rotating the same as shown in FIG. 2 (a). Further, the electric motor 10 is arranged to control the rotating direction of the input shaft 22 by means of a brake (regenerative) effect of the electric motor 10. Even during such control, as shown in FIG. 2 (b), the input shaft 22 is applied with load torque, i.e., brake (regenerative) torque $T_B$, at a rate proportionate to the magnitude of the generated current $I_G$ supplied to or stored in the battery or the like mounted on, for instance, the vehicle.

The clutches Cs and Ci and the brake Bs are hydraulically operated friction engaging devices, including multi-disc type clutches or brakes, each of which is brought into frictional engagement or disengagement due to an associated hydraulic actuator and a hydraulic pressure applied thereto. With the brake Bs caused to completely engage, the stator wheel 6s is fixedly secured to the case 11 to be rendered non-rotatable. Even with a slippage occurring when adjusting the degree of engagement, i.e., an engaging pressure, of the brake Bs, the stator wheel 6s is arranged to rotate in the negative rotating direction opposite to the positive rotating direction of the pump wheel 6p in a relative effect. In this moment, the stator wheel 6s is applied with load torque, i.e., brake torque $T_B$, in the negative rotating direction at a rate increasing with an increase in, for instance, the engaging pressure. Upon engagement of the clutch Cs, further, the stator wheel 6s is applied with drive torque $T_D$ or brake torque $T_B$ intact from the electric motor 10. Moreover, due to the slippage of the clutch Cs occurring when adjusting the degree of engagement, i.e., the engaging pressure of the clutch Cs, a transfer rate of drive torque $T_D$ or brake torque $T_B$ is caused to vary depending on the magnitude of the relevant engaging pressure of the clutch Cs. In addition, upon engagement of the clutch Ci, drive torque $T_D$ or brake torque $T_B$ is delivered intact from the electric motor 10. Besides, due to the slippage of the clutch Ci occurring when adjusting the degree of engagement, i.e., the engaging pressure of the clutch Ci, the transfer rate of drive torque $T_D$ or brake torque $T_B$ is caused to vary depending on the magnitude of the relevant engaging pressure of the clutch Ci.

The automatic transmission 8 includes a first shifting portion 14, mainly comprised of a first planetary gear set 12 of a double pinion type, and a second shifting portion 20 mainly comprised of a second planetary gear set 16 of a single pinion type and a third planetary gear set 18 of a double pinion type, which are incorporated on a common axis in the case 11 mounted on a vehicle body as a non-rotating member. This allows the rotation of the input shaft 22 to shift in speed to be output from an output shaft 24. The input shaft 22 also acts as a turbine shaft of the torque converter 6 that is rotatably driven with the drive force delivered from the engine 9 serving as the drive-force source for run. In addition, the torque converter 6 and the automatic transmission 8 take the form of nearly symmetric structures with respect to their center axes and, hence, lower halves of these structures are herein omitted from the skeleton view of FIG. 1.

The first planetary gear set 12 includes a sun gear S1, pinion gears P1 held in meshing engagement with each other in pairs, a carrier CA1 supporting the pinion gears P1 to be rotatable about their axes and about the axis of the sun gear S1, and a ring gear R1 held in meshing engagement with the sun gear S1 via the pinion gears P1. Likewise, the second planetary gear set 16 includes a sun gear S2, pinion gears P2, a carrier CA2 supporting the pinion gears P2 to be rotatable about their axes and about the axis of the sun gear S2, and a ring gear R2 held in meshing engagement with the sun gear S2 via the pinion gears P2. In addition, the third planetary gear set 18 includes a sun gear S3, pinion gears P2 and P3 held in meshing engagement with each other in pairs, a carrier CA3 supporting the pinion gears P2 and P3 to be rotatable about their axes and about the axis of the sun gear S3, and a ring gear R3 held in meshing engagement with the sun gear S3 through the pinion gears P2 and P3.

In FIG. 1, clutches C1 to C4 and brakes B1 and B2 are hydraulically operated friction engaging devices such as multi-disc type clutches or brakes, respectively, like those of the clutches Cs and Ci and the brake Bs, each of which is caused to engage or disengage by a hydraulic actuator and a hydraulic pressure applied thereto. A first rotary element RM1 (sun gear S2) is selectively coupled to the case 11 via the first brake B1 to halt in rotation and selectively coupled to the ring gear R1 (i.e., a second intermediate output pathway PA2) of the first planetary gear set 12 in the form of an intermediate output member via the third clutch C3. The first rotary element RM1 is also selectively coupled to the carrier CA1 (i.e., an indirect pathway PA1b of a first intermediate output path PA1) of the first planetary gear set 12 via the fourth clutch C4.

Further, a second rotary element RM2 (carriers CA2 and CA3) is selectively coupled to the case 11 via the second brake B2 to halt in rotation and selectively coupled to the input shaft 22 (i.e., a directly connected pathway PA1a of the first intermediate output pathway PA1) via the second clutch C2. Furthermore, a third rotary element RM3 (ring gears R2 and R3) is integrally connected to the output shaft 24 to output the rotation of the third rotary element RM3. Moreover, a fourth rotary element RM4 (sun gear S3) is connected to the ring gear R1 via the first clutch C1. In addition, a one-way clutch F1 is interposed between the second rotary element RM2 and the case 11 in parallel to the second brake B2 for permitting the second rotary element RM2 in a positive rotating direction (in agreement with the rotating direction of the input shaft 22) while blocking a reverse rotation of the second rotary element RM2.

FIG. 3 is a table illustrating operating states of the various engaging elements used for establishing various gear positions in the automatic transmission 8 with a symbol "o" representing an engaging state and a symbol "(o)" representing an engaging state established only during engine braking while a blank state represents a disengaging state. As shown in FIG. 3, the automatic transmission 8 of the present embodiment is arranged to establish each of a plurality of gear positions including forward-drive 8 gear positions different in speed ratio (=an input-shaft rotation speed $N_{IN}$ of the automatic transmission 8 versus an output-shaft rotation speed $N_{OUT}$ of the automatic transmission 8). These gear positions are established by causing the various engaging devices, i.e., a plurality of hydraulically operated friction engaging devices (clutches C1 to C4 and brakes B1 and B2) to be selectively engaged. In addition, the various gear positions have speed ratios that are properly determined with various gear ratios $\rho 1$, $\rho 2$ and $\rho 3$ of the first planetary gear set 12, the second planetary gear set 16 and the third planetary gear set 18.

FIG. 4 is a block diagram illustrating a control system provided on the vehicle for controlling the engine 9, the automatic transmission 8 or the torque converter 6, etc. The electronic control device 78 is supplied with signals including: a signal representing an engine rotation speed $N_E$ delivered from an engine rotation speed sensor 80; a signal representing a turbine rotation speed $N_T$, i.e., an input-shaft rotation speed $N_{IN}$, delivered from a turbine rotation speed sensor 82; a signal representing a stator rotation speed Ns delivered from a stator rotation speed sensor 83; a signal representing an intake air quantity $Q_A$ delivered from an intake-air quantity sensor 84; a signal representing an intake-air temperature $T_A$ delivered from an intake-air temperature sensor 86; a signal representing a vehicle speed V, i.e., an output-shaft rotation speed $N_{OUT}$, delivered from a vehicle speed sensor 88; a signal representing a throttle valve opening $\theta_{TH}$ delivered from a throttle opening sensor 90; a signal representing a coolant-water temperature $T_W$ delivered from a coolant-water temperature sensor 92; a signal representing a working-oil temperature $T_{OIL}$ of a hydraulic control circuit 30 delivered from a working-oil temperature sensor 94; a signal representing an operated value (displacement value) Acc of an accelerator operation member such as an accelerator pedal 98 or the like delivered from an accelerator's displacement sensor 96; a signal representing the presence or absence of a foot brake 102 in the form of a normal-use brake being operated and delivered from a foot brake switch 100; and a signal representing a lever position (operated position) $P_{SH}$ of a shift lever 106 delivered from a lever position sensor 104, etc.

The electronic control device 78 includes a so-called microcomputer composed of CPU, RAM, ROM and input/output interfaces, etc. The CPU processes various input signals in accordance with programs preliminarily stored in ROM while utilizing a temporary storage function of RAM to output signals, i.e., output signals to an electronic throttle valve 108, a fuel injection device 110, an ignition device 112, linear solenoid valves, etc., of the hydraulic control circuit 30 or the electric motor 10, etc. The electronic control device 78 has a structure arranged to perform such input/output signal processing to execute output control of the engine 9, drive and regenerative control of the input shaft 22 with the electric motor 10, shift control of the automatic transmission 8 or rotation control of the stator wheel 6s of the torque converter 6, etc. Thus, the electronic control device 78 is divided in structure for engine control and shift control depending on needs.

With the present embodiment, the output control of the engine 9 is accomplished with the electronic throttle valve 108, the fuel injection device 110 and the ignition device 112, etc.

The shift control of the automatic transmission 8 is accomplished with the hydraulic control circuit 30. For instance, a gear position to be shifted in the automatic transmission 8 is determined based on an actual throttle valve opening $\theta_{TH}$ and vehicle speed V by referring to a preliminarily stored shifting diagram (shifting map), upon which the clutch C1 to C4 and the brakes B1 and B2 are switched to engaging or disengaging states in accordance with the operation table shown in FIG. 3 so as to establish the determined gear position.

The torque converter 6 performs the rotation control of the stator wheel 6s using the clutch Cs, the brake Bs and the electric motor 10. In particular, the rotation control of the stator wheel 6s is accomplished by suitably adjusting drive torque $T_D$ at a rate proportionate to the magnitude of the drive current $I_D$ supplied to the electric motor 10 from the inverter (not shown) in accordance with a command from the electronic control device 78, or brake torque $T_B$ at a rate proportionate to, for instance, the magnitude of the generated-current $I_G$ output from the electric motor 10.

Figure 5:
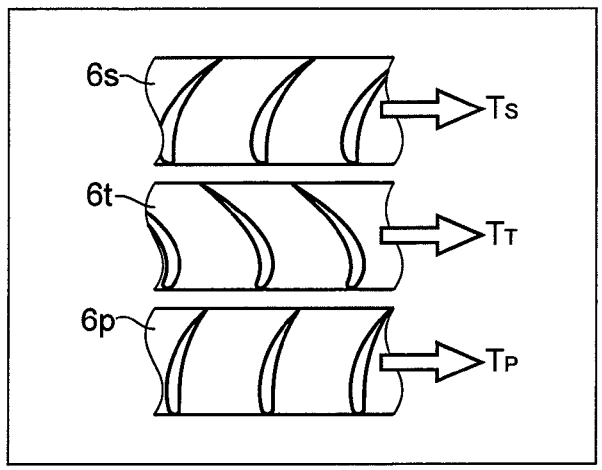
FIG. 5 is a view showing various wheels whose respective vanes have shapes formed along a streamline FL of working oil in the torque converter.

With the torque converter 6 of the present embodiment, working oil, stick onto an outer circumferential area due to a centrifugal force, circulates through the pump wheel 6p, the turbine wheel 6t and the stator wheel 6s in this order in a cross section of the torque converter 6 so as to move along a streamline FL shown in FIG. 1. As shown in FIG. 5, the pump wheel 6p, the turbine wheel 6t and the stator wheel 6s include pluralities of vanes spaced by fixed intervals along a circumferential direction, respectively. FIG. 5 represents the vanes with shapes formed along the streamline FL of working oil filled in the torque converter 6 in each wheel. Working oil, applied with energy from the vanes of the pump wheel 6p to flow, acts on the vanes of the turbine wheel 6t to rotate the same. Working oil, passing across the turbine wheel 6t, impinges upon the vanes of the stator wheel 6s to turn in direction in a converter region, after which working oil is circulated to the pump wheel 6p. With working oil impinged upon the vanes of the stator wheel 6s to turn in direction, the stator wheel 6s generates reactive torque. This reactive torque corresponds to a direction converting rate (angle) of working oil and is associated with the magnitude of a torque ratio "t" that will be described later.

According to a definition of angular momentum, torque T [N·m], applied to working oil (fluid) from the various wheels (the pump wheel 6p, the turbine wheel 6t and the stator wheel 6s), is given by equation (1) as expressed below.

$$T=(\gamma/g)\times Q\times\Delta(r\times v_U) \quad\quad \text{Eq. (1)}$$

In equation (1), "$\gamma$" is a weight volume ratio [kg/m$^3$] of working oil prevailing in the torque converter 6; "g" is a gravitational acceleration [m/s$^2$]; "Q" is a volumetric flow rate [m$^3$/s]; and "$\Delta(r\times v_U)$" is a difference in momentums "$r\times v_U$" [m$^2$/s] of fluid flows of working oil with absolute velocities at an outlet and an inlet of each wheel.

From equation (1), torque $T_1$ [N·m], applied to working oil from the pump wheel 6p, torque $T_2$ [N·m], applied to working oil from the turbine wheel 6t, and torque $T_3$ [N·m], applied to working oil from the stator wheel 6s, are given by equations (2) to (4), respectively. In equations (2) to (4), Tp is pump torque [N·m], i.e., engine torque; $T_T$ is turbine torque [N·m], i.e., output torque; and $T_S$ is stator torque [N·m] coincident with the magnitude of reactive torque of the stator wheel 6s, i.e., torque acting on the stator wheel 6s in the positive rotating direction in agreement with the rotating direction of the pump wheel 6p when the flow of working oil is caused to turn in direction by the action of the stator wheel 6s.

$$T_1=T_P=(\gamma/g)\times Q\times(V_{UP}\times r_2-V_{US}\times r_1) \quad\quad \text{Eq. (2)}$$

$$T_2=-T_T=(\gamma/g)\times Q\times(V_{UT}\times r_3-V_{UP}\times r_2) \quad\quad \text{Eq. (3)}$$

$$T_3=T_S=(\gamma/g)\times Q\times(V_{US}\times r_1-V_{UT}\times r_3) \quad\quad \text{Eq. (4)}$$

In equations (2) to (4), "$r_2$" is a distance [m] from a rotational axis, i.e., the input shaft (turbine shaft) 22 of the automatic transmission 8 to an outlet "bp" of fluid flow in the pump wheel 6p, that is, an inlet "at" of fluid flow in the turbine wheel 6t. "$r_3$" is a distance [m] from a rotational axis, i.e., the input shaft (turbine shaft) 22 of the automatic transmission 8 to an outlet "bt" of fluid flow in the turbine wheel 6t, that is, an inlet "as" of fluid flow in the stator wheel 6s. "$r_1$" is a distance [m] from a rotational axis, i.e., the input shaft (turbine shaft) 22 of the automatic transmission 8 to an outlet "bs" of fluid flow in the stator wheel 6s, that is, an inlet "ap" of fluid flow in the pump wheel 6p. In equations (2) to (4), further, $V_{UP}$ is a circumferential velocity component [m/s] of an absolute speed of the pump wheel 6p; $V_{UT}$ is a circumferential velocity component [m/s] of an absolute speed of the turbine wheel 6t; and $V_{US}$ is a circumferential velocity component [m/s] of an absolute speed of the stator wheel 6s.

From equations (2) to (4), $T_1+T_2+T_3=0$ (Zero) is established and, hence, pump torque $T_P$, turbine torque $T_T$ and stator torque $T_S$ can be given by equation (5) described below. That is, with the torque converter 6, a torque increment in turbine torque $T_T$ relative to pump torque $T_P$ coincides with stator torque $T_S$.

$$T_T=T_P+T_S \quad\quad \text{Eq. (5)}$$

With the torque converter 6 of the present embodiment, the reactive force of the stator wheel 6s is caused to increase or decrease in response to drive torque $T_D$ or brake torque $T_B$ that are adjusted in the rotation control of the electric motor 10. This allows the turbine wheel to provide output torque that is caused to increase or decrease with respect to output torque obtained by the related art torque converter with a fixed capacity.

Figure 6:
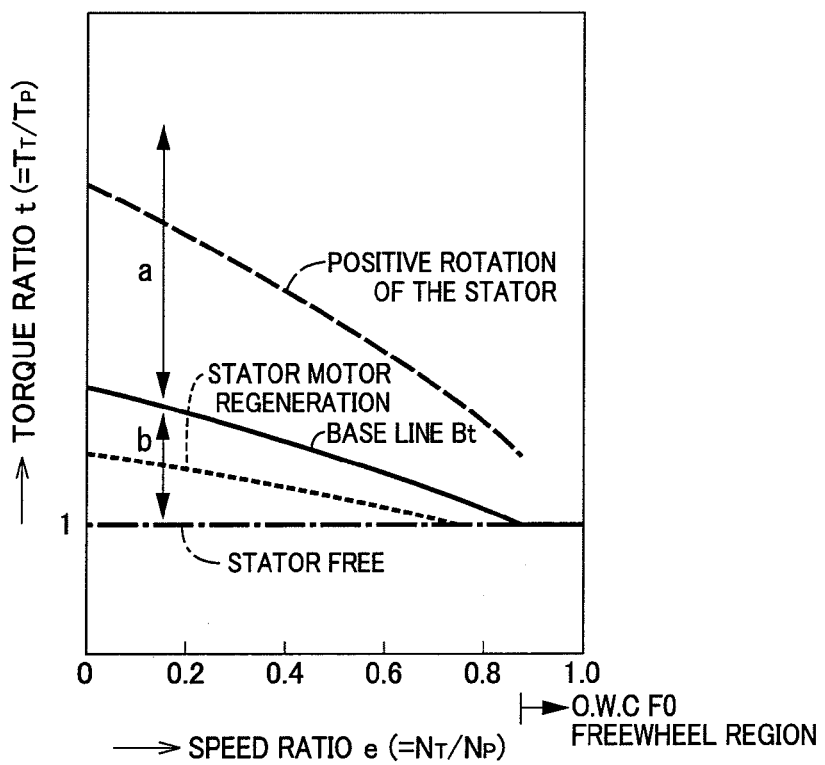
FIG. 6 is a view showing a torque ratio (torque multiplying ratio) between turbine torque and pump torque in terms of a rotational speed ratio, i.e., a speed ratio, between a turbine revolution of a turbine wheel and a pump revolution of a pump wheel.
Figure 7:
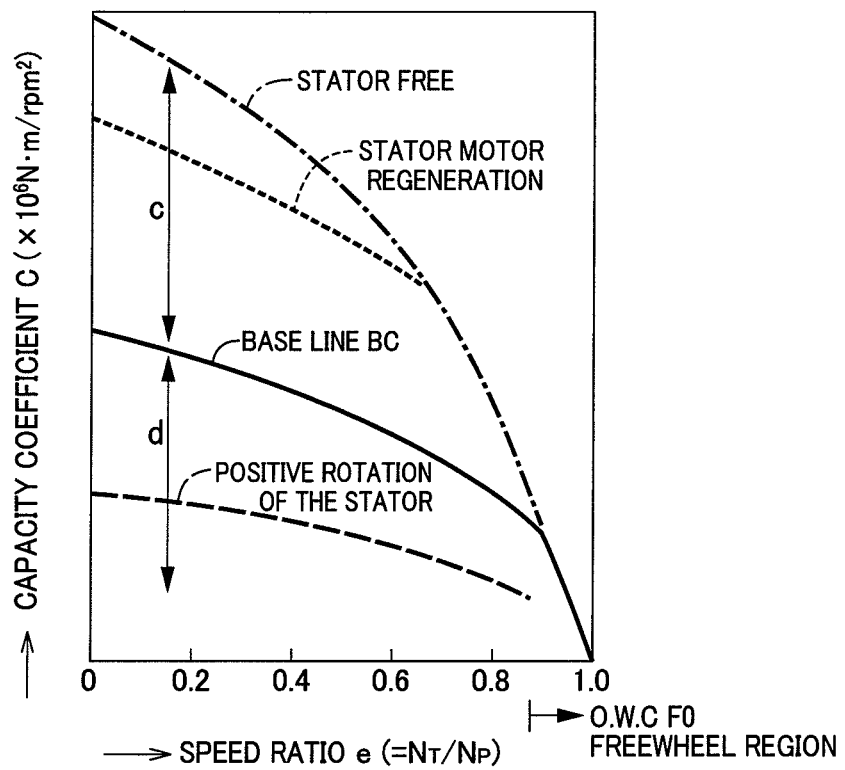
FIG. 7 is a view showing a capacity coefficient plotted in terms of the speed ratio.

FIGS. 6 and 7 are views showing characteristics of the torque converter 6 of the present embodiment representing the contents described above. FIG. 6 is a view showing a torque ratio (torque multiplying ratio) of "t" $(=T_T/T_P)$ between turbine torque $T_T$ and pump torque $T_P$ in terms of a rotational speed ratio between a turbine revolution $N_T$ [rpm] of the turbine wheel 6t and a pump revolution $N_P$ [rpm] of the pump wheel 6p, i.e., a speed ratio of "e" ($=N_T/N_P$). FIG. 7 is a view showing a capacity coefficient C ($=N_T/N_P^2$) [N·m/rpm²] in terms of e ($=N_T/N_P$).

In FIGS. 6 and 7, adjusting brake torque $T_B$ to lie at a given value or causing the brake Bs to engage allows the stator wheel 6s to be fixedly secured to the case 11. Thus, torque is transferred at a given torque ratio "t" determined on design like the related art torque converter with the fixed capacity as indicated by a baseline Bt plotted on a solid line in FIG. 6. Also, the resulting capacity coefficient C of the torque converter 6 traces a baseline BC indicated by a solid line in FIG. 7.

Further, with the clutch Cs caused to suitably engage, drive torque $T_D$ is adjusted with the electric motor 10 at a given value to cause the stator wheel 6s to rotate in the same direction as the pump wheel 6p. This causes stator torque $T_S$ to increase such that torque is transferred at a torque ratio "t" greater than that of the related art torque converter with the fixed capacity as indicated by a long broken line in FIG. 6 representing the positive rotation of the stator wheel. The resulting capacity coefficient C of the torque converter 6 varies in a manner as indicated by a long broken line in FIG. 7 representing the stator's positive rotation. Moreover, even with the presence of the same speed ratio "e", causing the electric motor 10 to further increase or decrease drive torque $T_D$ allows the torque ratio "t" and the capacity coefficient C to be suitably determined as indicated by arrows "a" and "d" in FIGS. 6 and 7, respectively. Such determination is made to fall in ranges starting from the baseline Bt, shown in FIG. 6, to an area beyond the long broken line, representing the stator's positive rotation, and starting from the baseline BC, shown in FIG. 7, to another area below the long broken line representing the stator's positive rotation.

Furthermore, when the clutch Cs and the brake Bs are caused to be disengaged and the stator torque $T_S$ is caused to be zero, no torque increase occurs as indicated by a single dot line representing a stator free in FIG. 6, under which torque is transferred with a torque ratio t=1. As a result, the torque converter 6 is rendered operative as a fluid coupling device. The resulting capacity coefficient C of the torque converter 6 varies as shown by a single dot line representing the stator free in FIG. 7.

Moreover, with a slippage caused to occur in the brake $B_S$ upon adjusting brake (regenerative) torque $T_B$ at a given value or adjusting the engaging pressure of the brake $B_S$ at a given value, stator torque $T_S$ will be lower than that of the torque converter with the stator wheel 6s being fixedly secured. This allows torque to be transferred at a torque ratio "t" smaller than that obtained with the related art torque converter with the fixed capacity as indicated by a short broken line representing stator motor regeneration in FIG. 6. The resulting capacity coefficient C of the torque converter 6 traces the short broken line representing the stator motor regeneration in FIG. 6. In addition, even with the presence of the same speed ratio "e", causing braking (regenerative) torque $T_B$ or the engaging pressure of the brake Bs to further increase or decrease allows the torque ratio "t" and the capacity coefficient C to be suitably determined within a range between the baselines Bt or BC, as indicated by arrows "b" and "c" in FIGS. 6 and 7, and the single dot line representing the stator free.

That is, with the present embodiment, the electric motor 10 rotatably controls the stator wheel 6s in the positive rotating direction in agreement with the rotating direction of the pump wheel 6p such that the torque ratio "t" is caused to increase. Further, with the present embodiment, the electric motor 10 rotatably controls the stator wheel 6s in the negative rotating direction opposite to the rotating direction of the pump wheel 6p with a braking (regenerative) effect such that the torque ratio "t" is caused to decrease. Moreover, with the present embodiment, the brake Bs is caused to slip for rotatably controlling the stator wheel 6s in the negative rotating direction opposite to the rotating direction of the pump wheel 6p, thereby achieving a reduction in the torque ratio "t".

Further, the drive and regenerative control of the input shaft 22, relied on the electric motor 10, is performed with the clutch Ci and the electric motor 10. More particularly, the drive and regenerative control is executed with the clutch Ci remaining engaged. Such a control is executed upon suitably adjusting drive torque $T_D$, proportionate to the magnitude of the drive current $I_D$ supplied from the inverter to the electric motor 10 in accordance with a command from the electronic control circuit 78, or braking (regenerative) torque $T_B$ proportionate to the magnitude of the generated-current $I_G$ output from the electric motor 10.

Thus, the vehicular drive apparatus 7 is structured with a capability of suitably altering run modes of the vehicle by causing the clutches Cs and Ci and the brake Bs to selectively engage. In particular, engaging the clutch Cs results in a mode that enables the torque converter 6 to perform the variable displacement control. Engaging the clutch Ci results in a mode that enables the electric motor 10 to perform the drive and regenerative control of the vehicle. Further, engaging the brake Bs causes the stator wheel 6s to be brought into a nonrotating state with a resultant mode under which the torque converter is caused to function as the related art torque converter with the fixed capacity coefficient C. Also, the mode, available for the torque converter 6 to perform the variable displacement control, corresponds to a first mode of the present invention, under which engaging the clutch Cs, corresponding to the first connecting/disconnecting means, allows the electric motor 10 and the stator wheel 6s to be connected to each other for power-transmitting capability. This results in a capability of causing the electric motor 10 to control a rotating state of the stator wheel 6s. Further, the mode, enabling the drive and regenerative control of the vehicle, corresponds to a second mode of the present invention, under which engaging the clutch Ci, corresponding to the second connecting/disconnecting means, enables the electric motor 10 and the input shaft 22 to be connected to each other for power-transmitting capability. This results in a capability of causing the electric motor 10 to perform power running (driving) and braking (regenerating). Furthermore, the mode, enabling the torque converter to function as the related art torque converter, corresponds to a third mode of the present invention, under which engaging the brake Bs, corresponding to the third connecting/disconnecting means, allows the stator wheel 6s and the case 11 to be connected to each other such that the stator wheel 6s is brought into a halted state.

With the present embodiment, further, suitably engaging the clutches Cs and Ci and the brake Bs depending on the running condition of the vehicle allows the run modes of the vehicle to be altered. Hereunder, alternating control of such run modes will be described.

Figure 8:
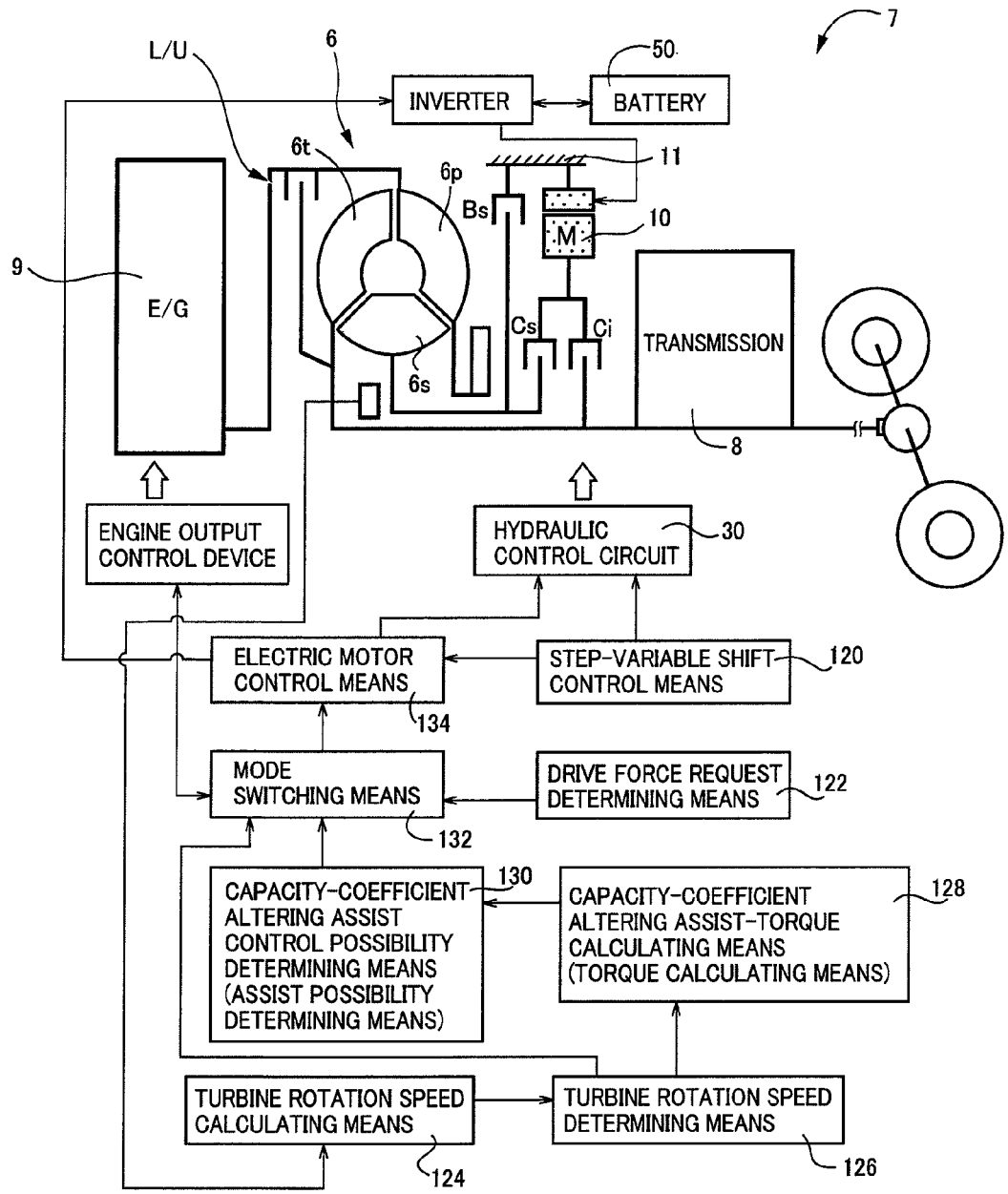
FIG. 8 is a functional block diagram illustrating a major part of control operations to be executed by an electronic control device.

FIG. 8 is a functional block diagram illustrating a major part of control operations to be executed by the electronic control device 78. Step-variable shift control means 120 determines, for instance, the running state of the vehicle for controlling the engagement and the disengagement of the lock-up clutch L/U based on the vehicle speed and the accel-opening Acc by referring to a preliminarily stored lock-up engagement map. In addition, the step-variable shift control means 120 determines whether to allow the shifting to be executed in the automatic transmission 8 based on the preliminarily stored shifting map to output a command to the hydraulic control circuit 30 for executing the shifting in accordance with the resulting determined result.

Drive force request determining means 122 executes the operation based on a predetermined driving regional map of the electric motor 10 defined in terms of parameters such as the accel-opening Acc, representing, for instance, a displacement value of the accelerator pedal, and the vehicle speed, etc., for thereby determining if a drive force request for the electric motor 10 is present.

If a determination is made that there is a need for the drive of the electric motor 10, then, turbine rotation speed calculating means 124 allows the turbine rotation speed sensor 83 to detect the turbine rotation speed $N_T$. Also, it doesn't matter if the turbine rotation speed $N_T$ is calculated based on the vehicle speed, i.e., the output-shaft rotation speed $N_{OUT}$, and a gear ratio of the automatic transmission 8. Turbine rotation speed determining means 126 determines if the turbine rotation speed $N_T$, detected by turbine rotation speed calculating means 124, is higher than an allowable rotation speed of the electric motor 10. Here, the allowable rotation speed of the electric motor 10 corresponds to a rotation speed determined in terms of a rating or a rotation speed calculated based on a current driving state of the electric motor 10. If the turbine rotation speed $N_T$, i.e., the rotation speed of the input shaft 22, exceeds the allowable rotation speed of the electric motor 10, then, there is a likelihood of causing the rotation speed of the electric motor 10 to exceed the allowable rotation speed, i.e., to be overspeeded when the electric motor 10 and the input shaft 22 are connected to each other (with the clutch Ci being caused to engage). Under such a situation, the variable displacement control of the torque converter 6 is carried out upon engaging the clutch Cs (in a first mode) while canceling the clutch Ci from engagement (in a second mode).

Capacity-coefficient altering assist-torque calculating means 128 (hereinafter referred to as "torque calculating means 128") calculates assist torque for the first mode being selected, i.e., for the variable displacement control of the torque converter 6. To this end, a current driving state of the vehicle is calculated based on rotating states of various rotary elements of, for instance, the torque converter 6 and a driving state of the engine 9 and, subsequently, a demanded drive force needed for a subsequent timing is calculated based on the accel-opening Acc with a related varying rate and the vehicle speed V, etc. Then, the drive force of the engine 9 and assist torque (auxiliary torque) of the electric motor 10 are calculated so as to obtain the relevant demanded drive force.

Capacity-coefficient altering assist control possibility determining means 130 (hereinafter referred to as "assist possibility determining means 130") determines if the electric motor 10 has a control possibility (in variable displacement control) to control assist torque calculated by the torque calculating means 128. For instance, a determination is made as to whether the control possibility is available in the presence of a limited output of the electric motor 10 due to a rated value thereof, the state of charge SOC of the battery 50 and a failure of the electric motor 10, etc.

Mode switching means 132 executes mode switching based on a determined result of the assist control possibility determining means 130 or the turbine rotation speed determining means 126. For instance, if the turbine rotation speed determining means 126 determines that the turbine rotation speed $N_T$ is greater than the motor's allowable rotation speed of the electric motor 10, then, the mode switching means 132 switches the mode into the variable displacement control (first mode) of the torque converter 6 upon causing the clutch Cs to engage. In actual practice, further, the switching to the first mode is executed based on the determined result of the assist control possibility determining means 130. On the contrary, if the turbine rotation speed determining means 126 determines that the turbine rotation speed $N_T$ is less than the motor's allowable rotation speed of the electric motor 10, then, the mode switching means 132 switches the mode into the drive and regenerative control (second mode) of the vehicle upon engaging the clutch Ci, i.e., upon directly connecting the electric motor 10 to the input shaft 22.

Further, if the turbine rotation speed determining means 126 determines that the turbine rotation speed $N_T$ is greater than the motor's allowable rotation speed of the electric motor 10 and the assist possibility determining means 130 determines that torque assist is possible due to the variable displacement control of the torque converter 6, then, the mode switching means 132 switches the modes to the variable displacement control (first mode) of the torque converter 6 with the clutch Cs brought into engagement. On the contrary, if a determination is made that the variable displacement control with the electric motor 10 is impossible to be performed, then, the mode switching means allows, for instance, the brake Bs to be suitably engaged such that the stator wheel 6s is brought into a halted state to cause the torque converter to act as the related art torque converter with the fixed capacity coefficient (third mode). In addition, controlling the engaging pressure of the brake Bs under slipping engagement enables the torque converter 6 to operate in variable displacement. Moreover, if the torque converter 6 falls in a coupling range, then, the brake Bs is caused to disengage such that the stator wheel 6s is caused to freewheel.

When switched to the first mode, electric motor control means 134 calculates the slipping state of the torque converter 6 upon detecting the rotation speeds of the pump wheel 6p, the turbine wheel 6t and the stator wheel 6s of the torque converter 6, while calculating the torque ratio "t" and the capacity coefficient C of the torque converter 6 upon calculating input torque. In addition, the torque ratio "tp" and the capacity coefficient Cp for the demanded drive force, i.e., for assist torque to be obtained with the electric motor 10, are calculated, and the rotation speed of the electric motor 10 is subjected to be controlled by so as to obtain these parameters. In an alternative, it doesn't matter if the electric motor 10 is subjected to feed-forward control so as to achieve a rotation speed determined based on a predetermined relational map defined in terms of assist torque of the electric motor 10 and the rotation speed of the electric motor 10. Further, even if switched to the second mode, the electric motor control means 134 allows the electric motor 10 to perform the drive control of the vehicle such that the demanded drive force is obtained. When this takes place, furthermore, it doesn't matter if the vehicle is placed in either an electrical run mode effectuated only with the electric motor 10 or an assist run mode effectuated with both the engine 9 and the electric motor 10. Thus, the mode switching means 132 switches the mode depending on the allowable rotation speed and assist torque of the electric motor 10.

Figure 9:
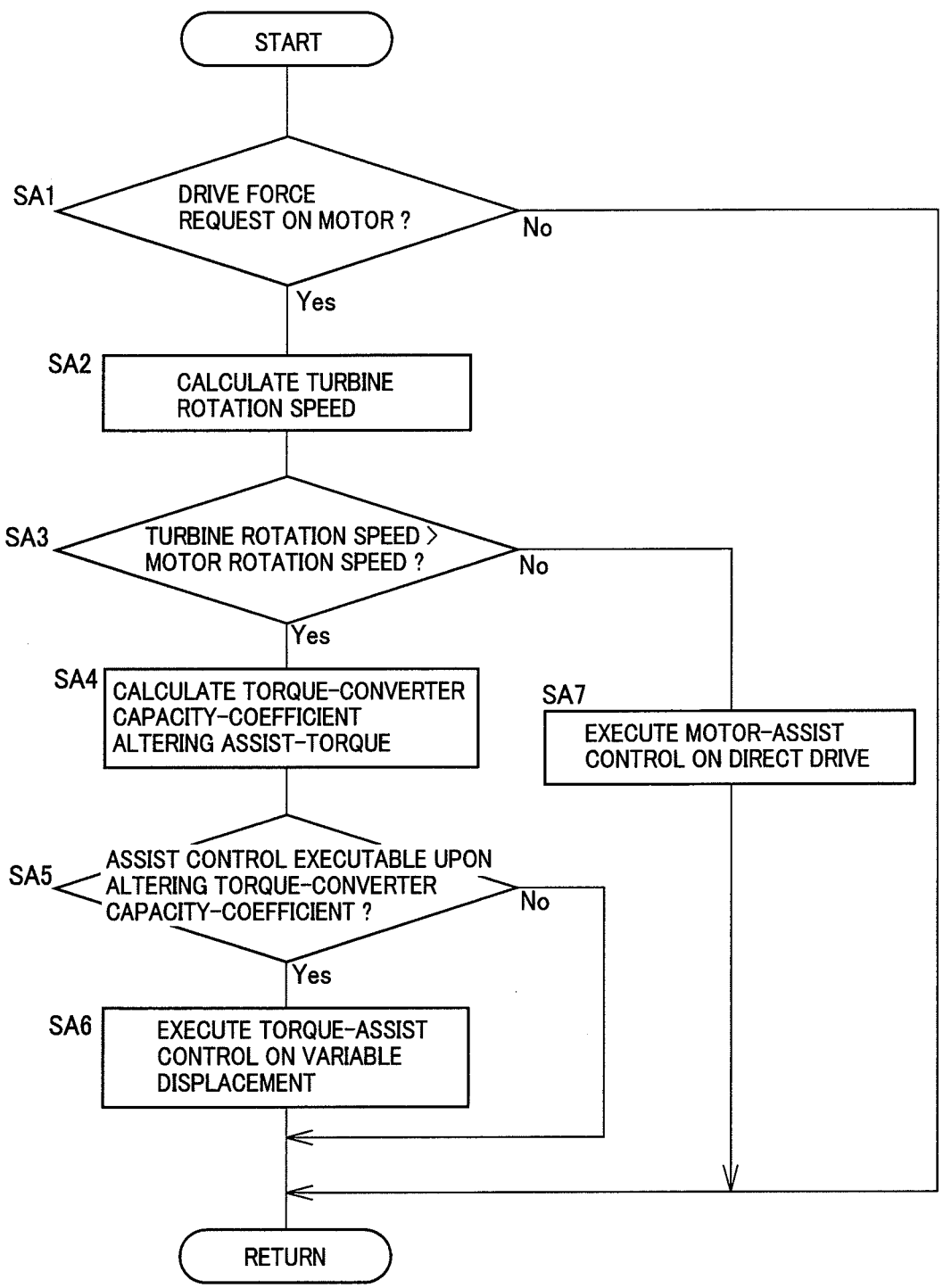
FIG. 9 is a flow chart illustrating the major part of the control operations to be executed by the electronic control device, i.e., control operations for selectively switching run modes depending on a running condition of the vehicle.

FIG. 9 is a flow chart illustrating a major part of control operations, to be executed by the electronic control device 78, i.e., control operations for selectively switching run modes depending on the running condition of the vehicle, which will be repeatedly executed for an extremely short cycle in the order of, for instance, several milliseconds or several tens milliseconds.

First, at SA1 corresponding to the drive force request determining means 122, a query is made as to whether a drive force request is present for the electric motor 10. If the answer to SA1 is no, then, the current routine is completed. If the answer to SA1 is yes, then, at SA2 corresponding to the turbine rotation speed calculating means 124, the rotation speed of the turbine wheel 6t is calculated. Subsequently, at SA3 corresponding to the mode switching means 132 and the turbine rotation speed determining means 126, a query is made as to whether the turbine rotation speed $N_T$ is higher than the allowable rotation speed of the electric motor 10. If the answer to SA3 is no, then, the electric motor 10 is enabled to directly perform the drive and regenerative control of the vehicle. Thus, at SA7 corresponding to the electric motor control means 134, the clutch Ci is caused to engage to allow the electric motor 10 and the input shaft 22 to be brought into a connected state. This allows the electric motor 10 to perform the drive (regenerative) control (second mode) of the vehicle.

If the answer to SA3 is yes, then, the variable displacement control of the torque converter 6 is carried out with the clutch Cs being engaged. First, at SA4 corresponding to the torque calculating means 128, assist torque for the capacity coefficient altering mode of the torque converter 6 is calculated. Then, at SA5 corresponding to the assist possibility determining means 130, a query is made based on assist torque, calculated at SA4, and the driving state of the electric motor 10 as to whether the assist with the electric motor 10 is available to be initiated. If the answer to SA5 is no, then, the mode is switched to, for instance, the third mode upon which the current routine is completed. If the answer to SA5 is yes, then, at SA6 corresponding to the electric motor control means 134, the clutch Cs is caused to engage such that the variable displacement control (first mode) of the torque converter 6. is executed.

With the present embodiment, further, the control device includes a torque converter 6 having a pump wheel 6p, a turbine wheel 6t and a stator wheel 6s rotatably disposed between the turbine wheel 6t and the pump wheel 6p; and an electric motor 10 operative to drive and/or apply a brake to the stator wheel 6s. Accordingly, using the electric motor 10 to rotate the stator wheel 6s in the positive rotating direction in agreement with the rotating direction of the pump wheel 6p and the negative rotating direction opposite to the rotating direction of the pump wheel 6p allows the torque ratio "t" and the capacity coefficient C to have wider variable ranges than those of the related art. This enables the vehicle to have remarkably increased fuel economy performance and power performance.

With the present embodiment, further, the control device includes mode switching means 132 for switching a first mode in which the clutch Cs is held in a connecting state to allow the electric motor 10 to control a rotating state of the stator wheel 6s and a second mode in which the clutch Ci is held in a connecting state to enable the electric motor 10 to perform power running and regeneration, depending on a running condition of a vehicle. Therefore, the first mode or the second mode can be favorably selected depending on the running condition of the vehicle. This allows favorable control to be executed depending on the mode such that the vehicle can have remarkably increased fuel economy performance and power performance.

With the present embodiment, further, the mode switching means 132 switches the modes to either one of the first and second modes depending on an allowable rotation speed of the electric motor 10. Therefore, calculating the allowable rotation speed of the electric motor 10 results in a capability for favorably switching the mode such that the vehicle can have remarkable increases fuel economy performance and power performance.

With the present embodiment, further, the mode switching means 132 switches the modes to the first mode when a rotation speed of the turbine wheel 6t is higher than the allowable rotation speed of the electric motor 10. This enables the variable displacement control of the torque converter 6 to be performed. This assists the drive force of the vehicle through the variable displacement of the torque converter 6. In addition, connecting the electric motor 10, when the rotation speed of the turbine wheel 6s reaches a high level, avoids the electric motor 10 from rotating at an overspeed.

With the present embodiment, further, the mode switching means 132 switches the modes to the second mode when a rotation speed of the turbine wheel 6t is lower than the allowable rotation speed of the electric motor 10. This enables the electric motor 10 to directly drive and apply a brake (regeneration) to the vehicle. Here, the "direct drive" of the electric motor 10 is meant to involve a so-called assist run under which the vehicle is propelled with the drive forces of the engine 9 and the electric motor 10.

With the present embodiment, further, the mode switching means 132 switches the mode further to the third mode depending on the running condition of the vehicle. As the mode is switched to the third mode, the stator wheel 6s is brought into the nonrotating state. Thus, properly switching the mode to the third mode also enables the torque converter to operate like the related art torque converter. With the torque converter 6 remained in, for instance, a torque converting range, the brake Bs is rendered to be in a connecting state so that the stator wheel 6s is caused to halt in rotation and thereby the torque ratio is increased. In addition, with the torque converter 6 remained in, for instance, a coupling range, the brake Bs is disconnected such that the stator wheel is caused to freewheel.

Next, description is provided of another embodiment according to the present invention. Also, in the following description, component parts common to those of the previous embodiment bear the same reference numerals to omit redundant description.

Embodiment 2

Figure 10:
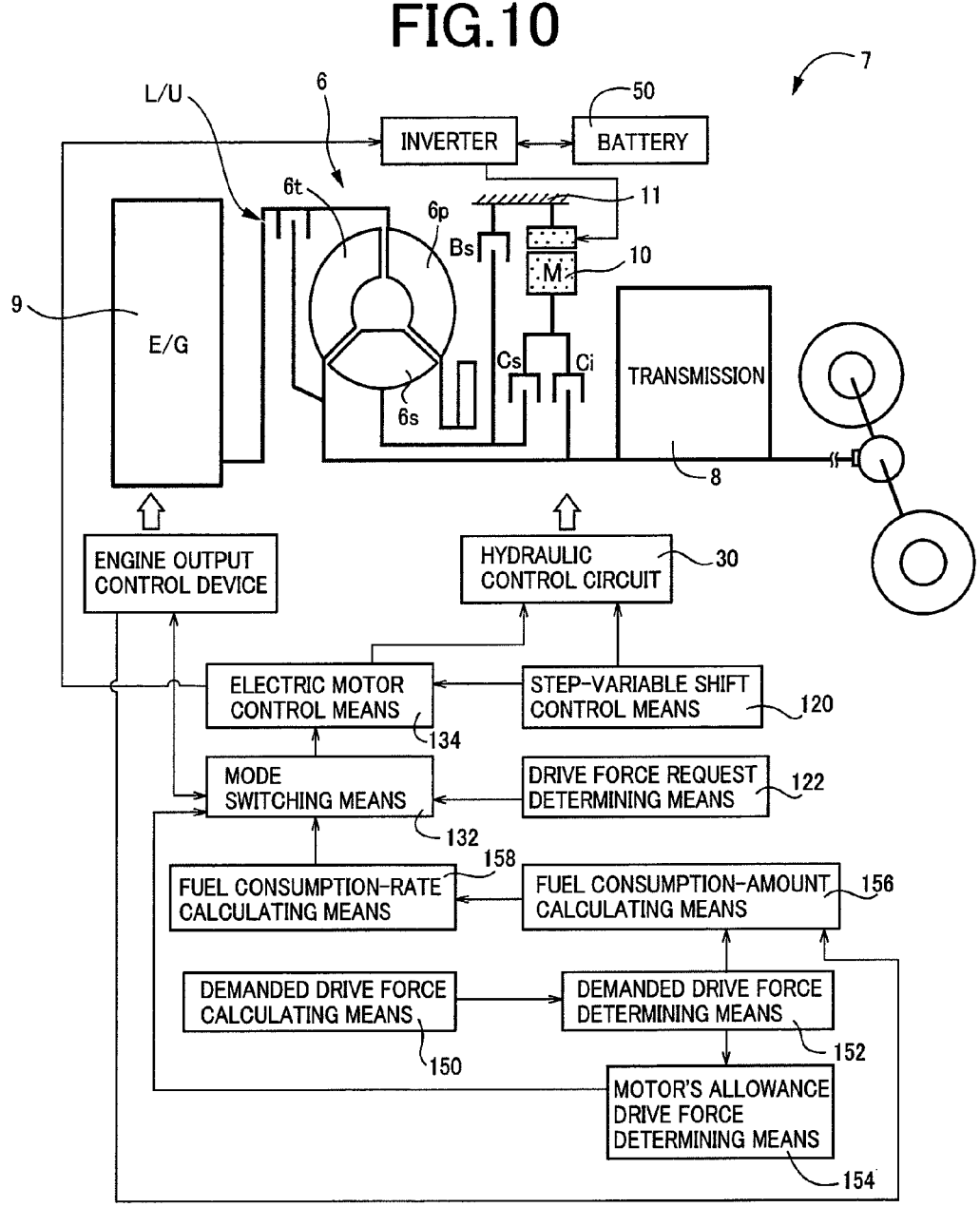
FIG. 10 is a functional block diagram illustrating a major part of control operations to be executed by an electronic control device of another embodiment according to the present invention.

FIG. 10 is a functional block diagram illustrating a major part of control operations to be executed by an electronic control device 78 of another embodiment according to the present invention. Step-variable shift control means 120 and drive force request determining means 122 are similar to those of the embodiment previously mentioned and, hence, description of the same is herein omitted. Demanded drive force calculating means 150 calculates a demanded drive force, required by a driver, based on the accel-opening Acc and the vehicle speed V, etc. Demanded drive force determining means 152 compares a demanded drive force, resulting from calculation, to a drive force, available to be output from the electric motor 10 in terms of the rating thereof, or a drive force calculated based on a current driving state of the electric motor 10 available to be output. Then, a determination is made as to whether the demanded drive force is greater than the drive force available to be output from the electric motor 10.

If the answer of the demanded drive force determining means 152 is no, i.e., when the drive force, available to be output from the electric motor 10, is greater than the demanded drive force, then, motor's allowance drive force determining means 154 is executed. The motor's allowance drive force determining means 154 determines if an allowance drive force, defined in terms of a difference between the demanded drive force being calculated and the drive force available to be output from the electric motor 10, is greater than a threshold value that is preliminarily determined on experimental tests. Here, the threshold value is set to be a drive force that can comply with requirements for acceleration occurring when the accelerator pedal is further depressed.

Subsequently, the mode switching means 132 selects an optimum running pattern (run mode) of the vehicle depending on a determined result of the motor's allowance drive force determining means 154. For instance, if the allowance drive force is greater than the threshold value, then, the mode switching means 132 determines that the vehicle is enabled to run only with the electric motor 10. Thereafter, the engine 9 is halted in operation with the mode switched to an electrical run mode (first mode) to be driven only with the electric motor 10. In contrast, if the allowance drive force is less than the threshold value, then, the mode switching means 132 switches the modes to an assist run mode (first mode) to be driven with both the engine 9 and the electric motor 10. Then, the electric motor control means 134 allows the clutch Cs, involved in the switched first mode, to engage while permitting the electric motor 10 to execute the variable displacement control such that the demanded drive force is obtained. Also, the control operation of the electric motor 10 is similar to that of the embodiment previously mentioned and, hence, description of the same is herein omitted.

If the answer of the demanded drive force determining means 152 is yes, i.e., when the drive force, available to be output from the electric motor 10, is less than the demanded drive force, then, fuel consumption-amount calculating means 156 is executed. The fuel consumption-amount calculating means 156 initially calculates an instantaneous fuel consumption amount when the calculated demanded drive force is output, i.e., a fuel consumption amount of the engine 9 associated with the accel-opening Acc caused by the accelerator pedal being depressed. More particularly, the instantaneous fuel consumption amount WA of the engine 9 is calculated based on fuel injection data of the fuel injection device 110.

Further, the fuel consumption-amount calculating means 156 calculates a fuel consumption amount WB of the engine 9, involved in a direct assist mode, when propelling the vehicle directly with the electric motor 10 in an auxiliary run (assist run) mode, i.e., when executing the drive and regenerative control (second mode) with the electric motor 10. The fuel consumption amount WB is calculated based on, for instance, a fuel consumption-amount map, preliminarily determined on experimental tests in terms of a parameter including the calculated instantaneous fuel consumption amount WA or relational formulae on fuel consumption.

Furthermore, the fuel consumption-amount calculating means 156 calculates a fuel consumption amount WC of the engine 9, involved in a variable displacement assist mode, when executing the variable displacement control (first mode) of the torque converter 6, i.e., when executing the altering control of the capacity coefficient C and the torque ratio "t" of the torque converter 6 upon engaging the clutch Cs. The fuel consumption amount WC is calculated based on, for instance, the fuel consumption-amount map, preliminarily determined on experimental tests in terms of the parameter including the calculated instantaneous fuel consumption amount WA or the relational formulae on fuel consumption.

Fuel consumption-amount comparing means 158 makes a comparison between the fuel consumption amount WB, involved in the direct assist and calculated by the fuel consumption-amount calculating means 156, and the fuel consumption amount WC involved in the variable displacement assist, thereby determining if the fuel consumption amount WB is less than the fuel consumption amount WC.

Then, the mode switching means 132 switches the modes to the optimum run mode depending on the various selecting means set forth above. For instance, if the fuel consumption amount WB is less than the fuel consumption amount WC, then, the mode switching means 132 switches the modes to the run mode (second mode) in the direct assist with the electric motor 10. If the fuel consumption amount WB is greater than the fuel consumption amount WC, on the contrary, the mode switching means 132 switches the modes to the run mode (first mode) in the variable displacement assist. Then, the electric motor control means 134 outputs a command to the hydraulic control circuit 30 for engaging the clutch Cs or Ci, involved in the selected run mode, such that the electric motor 10 can be favorably controlled. In addition, the control operations of the electric motor 10, executed when the mode is switched to the first mode or the second mode, are carried out in the same steps as those of the previous embodiment described above and, hence, description of the same is herein omitted. In such a way, the mode switching means 132 switches the mode depending on the demanded drive force, the fuel consumption amount and the allowance drive force of the vehicle.

Figure 11:
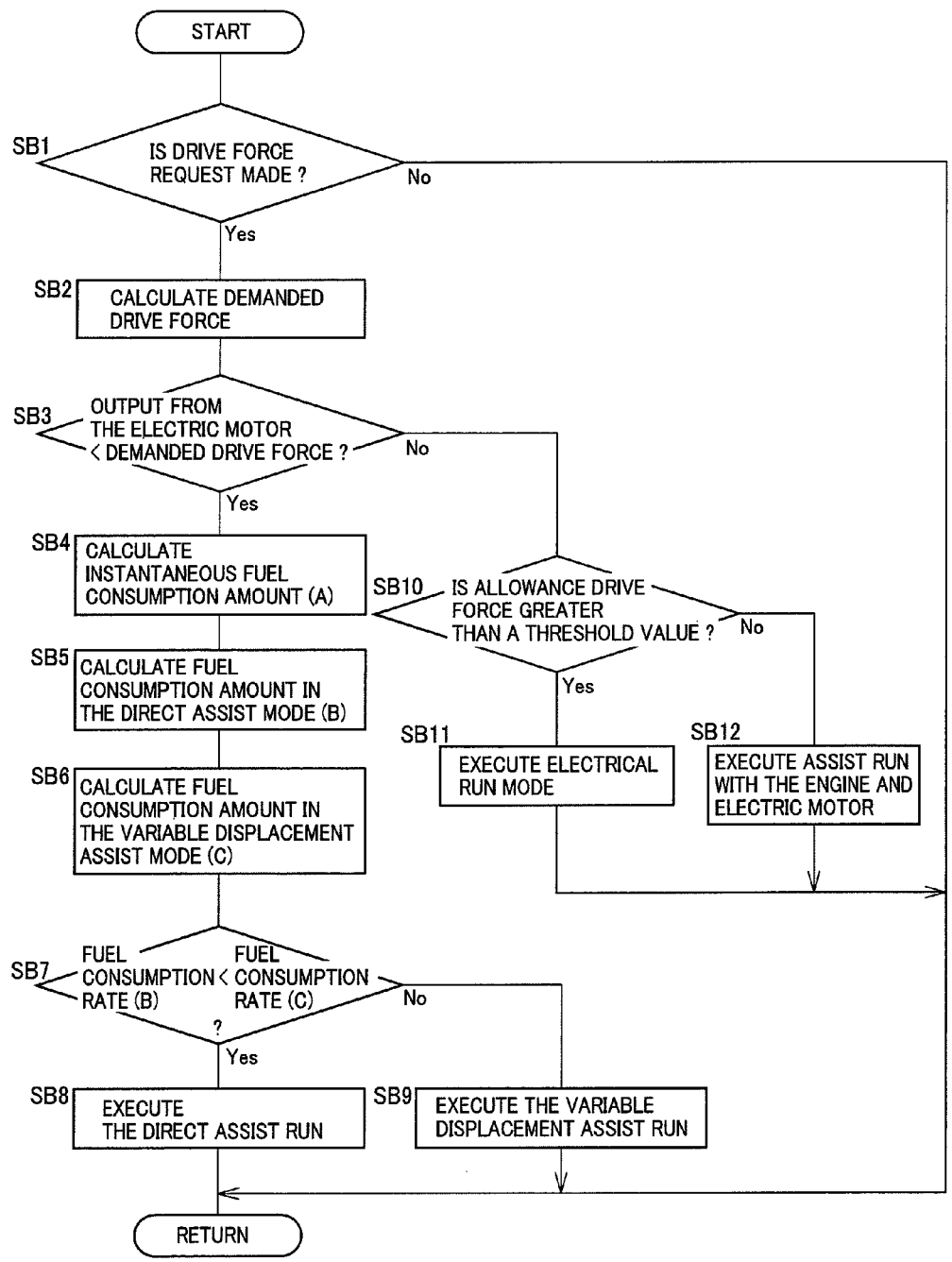
FIG. 11 is a flow chart illustrating a major part of control operations to be executed by the electronic control device, i.e., control operations for selectively altering the run modes depending on the running condition of the vehicle.

FIG. 11 is another flow chart illustrating a major part of control operations, executed with the electronic control device 78, i.e., control operations for selectively altering the run mode depending on the running condition of the vehicle, which will be executed for an extremely short cycle in the order of, for instance, several milliseconds or several tens milliseconds.

First, at SB1 corresponding to the drive force request determining means 122, a query is made as to whether a drive force request is made for the electric motor 10. If the answer to SB1 is no, then, the mode is switched to, for instance, the third mode upon which the current routine is completed. If the answer to SB1 is yes, then, at SB2 corresponding to the demanded drive force calculating means 150, the demanded drive force is calculated based on the accel-opening Acc and the vehicle speed V. Subsequently, at SB3 corresponding to the demanded drive force determining means 152, a query is made as to whether the demanded drive force, calculated at SB2, is greater than the drive force available to be output from the electric motor 10. If the answer to SB3 is no, then, at SB10 corresponding to the motor's allowance drive force determining means 154, a query is made as to whether the allowance drive force, defined in terms of a difference between the calculated demanded drive force and the drive force available to be output from the electric motor 10, is greater than a threshold value preliminarily determined on experimental tests. If the answer to SB10 is yes, then, at SB11 corresponding to the mode switching means 132 and the electric motor control means 134, the electrical run mode is executed. On the contrary, if the answer to SB10 is no, then, at SB12 corresponding to the mode switching means 132 and the electric motor control means 134, the assist run with the engine 9 and the electric motor 10 is executed.

Again at SB3, if the answer to SB3 is yes, then, at SB4 corresponding to the fuel consumption-amount calculating means 156, the instantaneous fuel consumption amount WA of the engine 9 is calculated. At succeeding SB5 corresponding to the fuel consumption-amount calculating means 156, the fuel consumption amount WB, involved in the direct assist (second mode) executed with the electric motor 10, is calculated. Further, at SB6 corresponding to the fuel consumption-amount calculating means 156, the fuel consumption amount WC, involved in the variable displacement control (first mode) executed with the torque converter 6, is calculated.

Subsequently, at SB7 corresponding to the fuel consumption-amount comparing means 158, the fuel consumption amount WB and the fuel consumption amount WC, calculated at SB5 and SB6, respectively, are compared to each other to make a query as to whether the fuel consumption amount WB is less than the fuel consumption amount WC. If the answer to SB7 is yes, then, at SB8 corresponding to the mode switching means 132 and the electric motor control means 134, the run is initiated with the direct assist (second mode) of the electric motor 10. If the answer to SB7 is no, then, at SB9 corresponding to the mode switching means 132 and the electric motor control means 134, the run is executed with the variable displacement assist (first mode) effectuated by the electric motor 10.

With the present embodiment, further, the mode switching means 132 switches the modes to either one of the first and second modes depending on a demanded drive force of the vehicle. Therefore, calculating the demanded drive force of the vehicle enables the mode to be switched to an appropriate run mode with remarkable increase in fuel economy performance and power performance of the vehicle. Moreover, if there is a request for a drive force exceeding an output potential limit of the electric motor 10, then, the execution of such a relevant control can be avoided.

With the present embodiment, further, the mode switching means 132 switches the modes to either one of the first and second modes based on a comparison between the demanded drive force of the vehicle and an output of the electric motor 10. This enables the mode to be switched to an appropriate mode in conformity to performance of the electric motor 10.

With the present embodiment, further, when the demanded drive force of the vehicle is greater than the output of the electric motor 10, the mode switching means 132 switches the modes to a mode involved in a lower fuel consumption amount determined by the fuel consumption-amount comparing means 158. This enables the vehicle to have improved fuel economy performance.

With the present embodiment, further, if the demanded drive force of the vehicle is less than the output of the electric motor 10, then, the mode switching means 132 switches the modes to the second mode, thereby enabling the electric motor 10 to drive the vehicle in direct assist (involving an electrical run mode).

Embodiment 3

Figure 12:
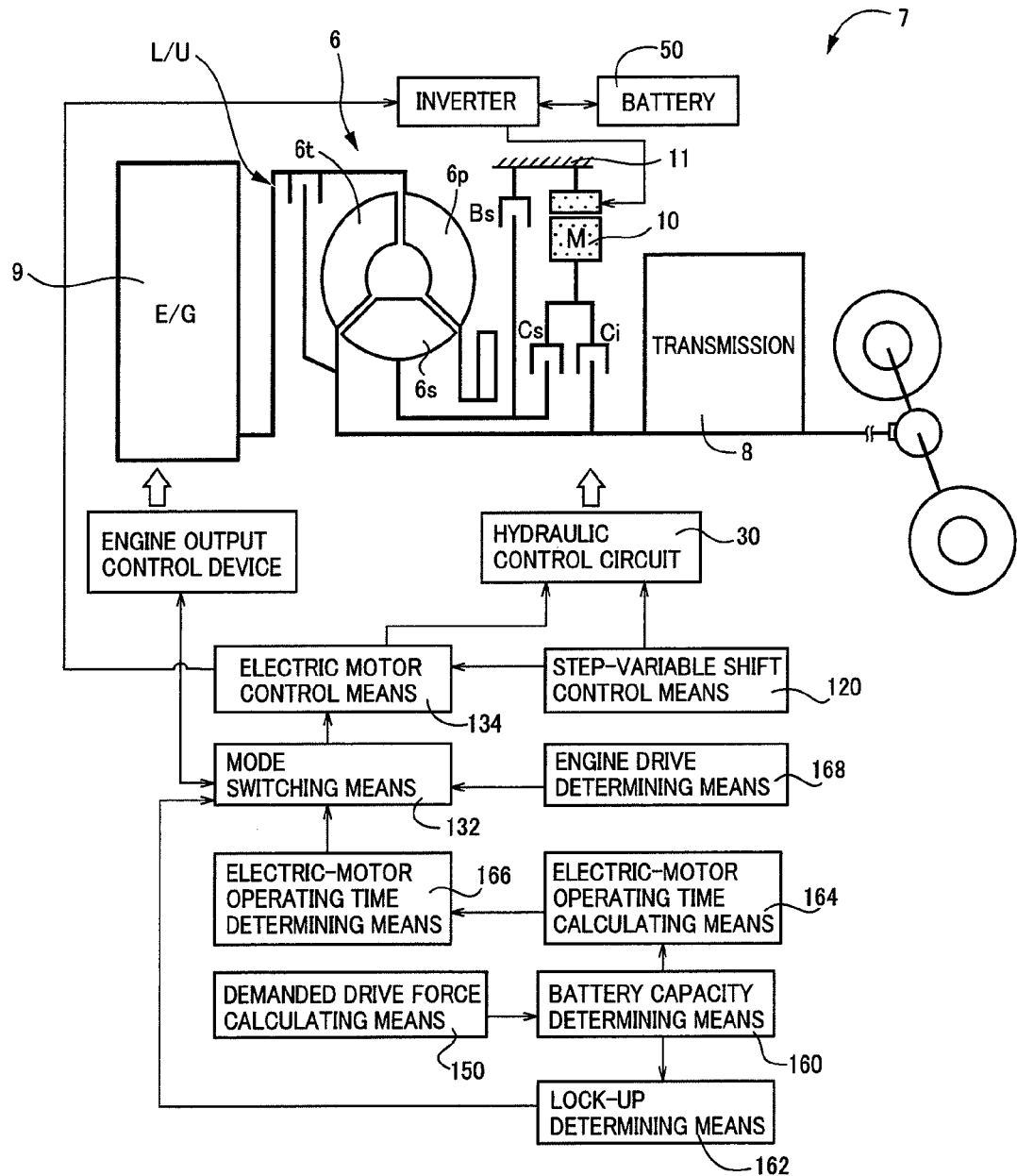
FIG. 12 is a functional block diagram illustrating a major part of control operations to be executed by an electronic control device of another embodiment according to the present invention.

FIG. 12 is a functional block diagram illustrating a major part of control operations to be executed by an electronic control device 78 of another embodiment according to the present invention. The step-variable shift control means 120 is similar to that of the previous embodiment and, hence, description of the same is herein omitted. Engine drive determining means 168 determines if the engine 9 lies in a drive state. The demanded drive force calculating means 150 calculates the demanded drive force, required by the driver, on the basis of the accel-opening Acc, the vehicle speed V and the gear ratio of the automatic transmission 8, etc. Battery capacity determining means 160 determines if the state of charge SOC of the battery 50, from which electric power is supplied to the electric motor 10, is less than a threshold value S in agreement with a predetermined allowable lower limit value. If the state of charge SOC is less than the threshold value S, lock-up determining means 162 is executed.

The lock-up determining means 162 determines if lock-up clutch control is executed in the torque converter 6. A control state of the lock-up clutch L/U is determined based on an output signal, applied to the solenoid valve (not shown) for switching, for instance, the operation of the lock-up clutch L/U, and an engaging pressure acting as a drive-force source for causing the lock-up clutch L/U to engage. Depending on a determined result of the lock-up determining means 162, the mode switching means 132 switches the modes to an appropriate mode powered with the electric motor 10. In particular, if the lock-up control is executed, then, the mode switching means 132 causes the clutch Ci to engage (in the second mode) to allow the electronic motor control means 134 to execute power generation control with the regeneration of the input shaft 22. On the contrary, if no lock-up control is executed, the mode switching means 132 allows the clutch Cs to engage (in the first mode) to allow the electronic motor control means 134 to execute power generation control with the regeneration of the stator wheel 6s.

Further, if the battery capacity determining means 160 determines that the state of charge SOC is greater than the threshold S, then, electric-motor operating time calculating means 164 is executed. The electric-motor operating time calculating means 164 calculates an EV-run enabling time T1 available to run the vehicle when propelling the vehicle only with the electric motor 10. In addition, the EV-run enabling time T1 is determined based on an operation enabling time map preliminarily determined on experimental tests in terms of, for instance, the drive force of the electric motor 10 and the state of charge SOC. Further, the electric-motor operating time calculating means 164 calculates a direct assist-run enabling time T2 available for the electric motor 10 to operate during the assist run thereof, i.e., for the vehicle to be propelled (in the second mode) with the engine 9 and the electric motor 10. Like the manner mentioned above, furthermore, the direct assist-run enabling time T2 is calculated based on an operation enabling time map preliminarily determined on experimental tests in terms of the drive force requested in the assist with the electric motor 10, and the state of charge SOC. When this takes place, the electric motor 10 is required to provide a drive force on the order of a value assisting the drive force of the engine 9 and, hence, the direct assist-run enabling time T2 becomes greater than the EV-run enabling time T1. Moreover, the electric-motor operating time calculating means 164 calculates a torque-converter assist-run enabling time T3 available to run the vehicle (in the first mode) when the demanded drive force is output in the variable displacement control of the torque converter 6. Like the manner mentioned above, moreover, the torque-converter assist-run enabling time T3 is calculated based on an operation enabling time map preliminarily determined on experimental tests in terms of the drive force of the electric motor 10, required for the demanded drive force to be output, and the state of charge SOC. When this takes place, the electric motor 10 is required to provide a drive force on the order of a value driving the stator wheel 6s and, hence, the torque-converter assist-run enabling time T3 becomes greater than the EV-run enabling time T1.

Electric-motor operating time determining means 166 compares the various run enabling times, calculated by the electric-motor operating time calculating means 164, to each other in magnitude relation. More particularly, first, the electric-motor operating time determining means 166 makes a comparison between the EV-run enabling time T1 and a threshold value T, representing an operating time preliminarily determined on experimental tests, for determining if the EV-run enabling time T1 is greater than the threshold value T. If the EV-run enabling time T1 is less than the threshold value T, then, the electric-motor operating time determining means 166 makes a further comparison between the direct assist-run enabling time T2, calculated by the electric-motor operating time calculating means 164, and the torque-converter assist-run enabling time T3 for determining if the direct assist-run enabling time T2 is greater than the torque-converter assist-run enabling time T3.

Then, the mode switching means 132 switches the modes to an appropriate run mode depending on a determined result of the electric-motor operating time determining means 166. More particularly, if a determination is made that, for example, the EV-run enabling time T1 is greater than the threshold value T, then, the mode switching means 132 switches the modes to the EV-run mode with only the electric motor 10. In contrast, if the EV-run enabling time T1 is less than the threshold value T and the direct assist-run enabling time T2 is greater than the torque-converter assist-run enabling time T3, then, a motor assist-run with the engine 9 and the electric motor 10 is carried out. That is, the mode is switched to the second mode. Further, if the EV-run enabling time T1 is less than the threshold value T and the direct assist-run enabling time T2 is less than the torque-converter assist-run enabling time T3, then, the mode switching means 132 executes a torque-converter assist run under the variable displacement control of the torque converter 6. That is, the mode is switched to the first mode. Then, the electric motor control means 134 allows the electric motor 10 to execute an appropriate control depending on these selected run modes. Here, the control operations executed for the electric motor 10 depending on the various run modes are similar to those of the embodiment previously mentioned and, hence, description of the same is herein omitted. Thus, the mode switching means 132 switches the mode depending on the state of charge SOC of the battery 50, the engaging state of the lock-up clutch L/U and the operation enabling times in the various modes of the electric motor 10.

Figure 13:
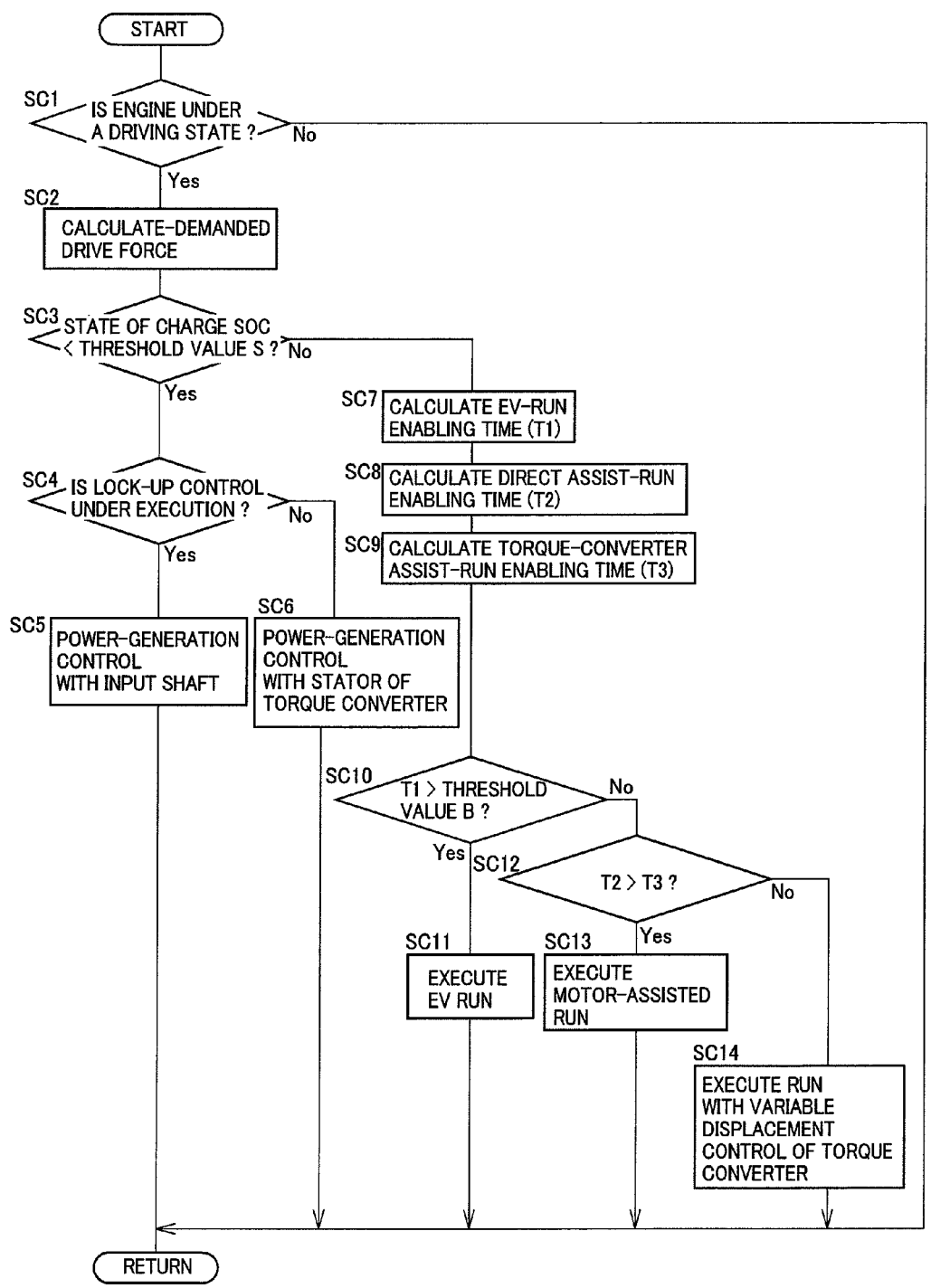
FIG. 13 is a flow chart illustrating a major part of control operations to be executed by the electronic control device, i.e., control operations for selectively altering the run modes depending on the running condition of the vehicle.

FIG. 13 is a flow chart illustrating a major part of control operations, executed with the electronic control device 78, i.e., control operations for selectively altering the run modes depending on the running condition of the vehicle, which will be executed for an extremely short cycle in the order of, for instance, several milliseconds or several tens milliseconds.

First, at SC1 corresponding to the engine drive determining means 168, a query is made as to whether the engine 9 is under a driving state. If the answer to SC1 is no, then, the current routine is completed. If the answer to SC1 is yes, then, at SC2 corresponding to the demanded drive force calculating means 150, a demanded drive force is calculated based on the accel-opening Acc and the vehicle speed V, etc. Subsequently, at SC3 corresponding to the battery capacity determining means 160, a query is made as to whether the state of charge SOC of the battery 50 is less than a threshold value S. If the answer to SC3 is yes, then, at SC4 corresponding to the lock-up determining means 162, a query is made as to whether the control of the lock-up clutch L/U is under the execution. If the answer to SC4 is yes, then, at SC5 corresponding to the mode switching means 132 and the electric motor control means 134, the second mode is selected to allow the power-generation control to be executed with the regeneration of the input shaft 22. On the contrary, if the answer to SC4 is no, then, at SC6 corresponding to the mode switching means 132 and the electric motor control means 134, the first mode is selected to allow the power-generation control to be executed with the regeneration of the stator wheel 6s.

Again at SC3, if the answer to SC3 is no, then, at SC7 corresponding to the electric-motor operating time calculating means 164, the operation is executed to calculate the EV-run enabling time T1 in agreement with the run-enabling time achieved only with the electric motor 10. Subsequently, at SC8 corresponding to the electric-motor operating time calculating means 164, the direct assist-run enabling time T2, operable when propelling the vehicle with the engine 9 and the electric motor 10, is calculated. Further, at SC9 corresponding to the operating time calculating means 164, the torque-converter assist-run enabling time T3, involved in the torque-converter assist run with the electric motor 10, is calculated. Then, at SC10 corresponding to the electric-motor operating time determining means 166, a query is made as to whether the EV-run enabling time T1 is greater than the threshold value T. If the answer to SC10 is yes, then, at SC11 corresponding to the mode switching means 132 and the electric motor control means 134, a determination is made that the drive is enabled only with the electric motor 10. In this moment, the engine 9 is halted in operation and the clutch C1 is caused to engage such that the run is executed with the electric motor 10 (in the second mode). On the contrary, if the answer to SC10 is no, then, at SC12 corresponding to the electric-motor operating time determining means 166, a query is further made as to whether the direct assist-run enabling time T2 is greater than the torque-converter assist-run enabling time T3. If the answer to SC12 is yes, then, at SC13 corresponding to the mode switching means 132 and the electric motor control means 134, a determination is made that the run with the engine 9 and the electric motor 10 is executed to execute the drive control with the engine 9 and the electric motor 10 (in the second mode). In addition, if the answer to SC12 is no, then, at SC14 corresponding to the mode switching means 132 and the electric motor control means 134, the run with the variable displacement control of the torque converter 6 is selected. In this moment, the clutch Cs is caused to engage such that the variable displacement control of the torque converter 6 is executed with the electric motor 10 (in the first mode).

With the present embodiment, further, the mode switching means 132 switches the modes to either one of the first and second modes depending on a state SOC of charge of a battery 50 from which electric power is supplied to the electric motor 10. Therefore, detecting the state of charge of the battery 50 enables the mode to be properly selected, thereby enabling a vehicle to have remarkably increased fuel economy performance and power performance. Moreover, with the battery 50 remained under a low capacity state, the electric motor 10 provides a limited output and no mode, in which a required output exceeds such a limited output, is selected.

With the present embodiment, further, when the state SOC of charge of the battery is less than a given threshold value S, the mode switching means 132 switches the modes to either one of the first and second modes depending on an engaging state of a lock-up clutch L/U provided in the torque converter 6. This allows the run to be initiated under an appropriate mode. For instance, with the lock-up clutch L/U remained under an engaging state, switching the mode to the second mode enables the power-generation control to be performed with the input shaft 22, enabling improvement in the state of charge SOC. Besides, with the lock-up clutch L/U remained under a disengaging state, the power-generation control with the stator wheel 6s can be performed, thereby enabling improvement in the state of charge SOC.

With the present embodiment, further, the control device includes an electric-motor operating time calculating means 164 for calculating operating times of the electric motor 10 for the first and second modes to be switched; and an electric-motor operating time comparing means 166 for making a comparison between the operating times in magnitude relation; and when the state SOC of charge of the battery 50 is larger than a given threshold value S, the mode switching means 132 switches the modes to an appropriate mode based on the comparison between the operating times of the electric motor 10. If the state of charge SOC of the battery 50 becomes greater than a given threshold value S, then, the mode switching means 132 switches the modes to an appropriate mode upon making a comparison between the operation enabling times of the electric motor 10 such that the vehicle is caused to run in an appropriate mode. During the second mode, for instance, if the operation enabling time T1, involved in the electrical run mode only with the electric motor 10, exceeds a given threshold value B, then, the mode is switched to the electrical run mode. In addition, making a comparison between operation start times for the first and second modes, respectively, allows the switching of a mode with a longer operation time.

Embodiment 4

Figures 14, 15:
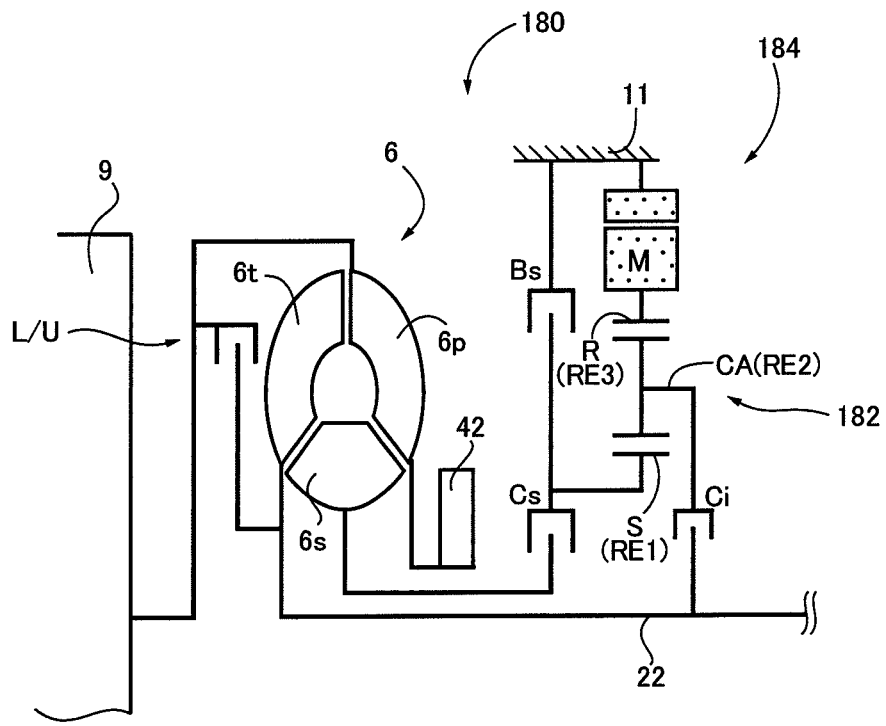
FIG. 14 is a skeleton view illustrating a part of a vehicular drive apparatus of another embodiment according to the present invention.
FIG. 15 is an engagement operation table showing the relationship and modes of the vehicular drive apparatus depending on engaging states of clutches and a brake.

FIG. 14 is a skeleton view illustrating a part of a vehicular drive apparatus 180 of another embodiment according to the present invention. The vehicular drive apparatus 180 is comprised of the vehicular drive apparatus 7, shown in FIG. 1 described above, and further includes a planetary gear set 182 interposed between the electric motor 10 and the torque converter 6. The planetary gear set 182 includes various rotary elements that are coupled to each other for power transmitting capability such that a differential mechanism 184 is formed.

With the differential mechanism 184, the planetary gear set 182 has a sun gear S selectively connected to the stator wheel 6s via the clutch Cs while selectively connected to the case 11, serving as a fixed member, via the brake Bs. The planetary gear set 182 has a carrier CA selectively connected to the input shaft 22 via the clutch Ci. A ring gear R of the planetary gear set 182 is connected to the electric motor 10. With the vehicular drive apparatus 180 of the present embodiment, the sun gear S constitutes a first rotary element RE1 of the present invention; the carrier CA constitutes a second rotary element RE2 of the present invention; and the ring gear R constitutes a third rotary element RE3 of the present invention. Even with the present embodiment, further, the clutch Cs constitutes first connecting/disconnecting means of the present invention; the clutch Ci constitutes second connecting/disconnecting means of the present invention; and the brake Bs constitutes third connecting/disconnecting means of the present invention.

Even with the vehicular drive apparatus 180 of the present embodiment formed in such a structure, like the embodiments previously mentioned, connecting/disconnecting the clutches Cs and Ci and the brake Bs depending on the running condition of the vehicle enables various operations to be properly executed. These operations include: the drive and regenerative control (second mode) with the electric motor 10; the variable displacement control (first mode) of the torque converter 6; and the operation (third mode) of the torque converter as the related art torque converter.

FIG. 15 is an engagement operation table showing modes of the vehicular drive apparatus 180 and the relationships established depending on engaging states of the clutches Cs and Ci and the brake Bs. For instance, causing the clutches Cs and Ci to be brought into engaging states (connected states) (corresponding to "o" in FIG. 15) enables the torque converter 6 to function in the first mode available to control the torque converter 6 in displacement thereof. Engaging the clutch Cs enables the electric motor 10 and the stator wheel 6s to be connected to each other via the planetary gear set 182 for power transmitting capability. In addition, engaging the clutch Ci enables the input shaft 22 and the carrier CA to be connected to each other, thereby causing the carrier CA to function as a reactive-force generating member. In addition, the input shaft 22 is connected to the drive wheels via the automatic transmission 8 with a greater inertia (inertia force) than that of the other rotary element. Thus, the input shaft 22 can be caused to function as the reactive-force generating member. This enables the electric motor 10 to control the rotation speed of the stator wheel 6s on a reactive-force baseline of the input shaft 22. This makes it possible to cause the torque converter 6 to function as a variable displacement type torque converter.

Further, causing the clutch Ci and the brake Bs to be brought into an engaging (connected) state allows the electric motor 10 to be connected to the input shaft 22 via the planetary gear set 182 for power transmitting capability (in the second mode). This enables the electric motor 10 to rotatably control the input shaft, while enabling the electric motor 10 to perform the regeneration with a drive force transferred from the input shaft 22. When this takes place, causing the brake Bs to engage allows the sun gear S to function as a reactive-force generating member.

Furthermore, causing the brake Bs to suitably engage (involving a slipping engagement) or disengage (corresponding to "⊚" in FIG. 15) with the clutch Cs remained engaged while causing the clutch Ci to remain disengaged (corresponding to empty box in FIG. 15) results in a third mode. With the brake Bs caused to engage, the stator wheel 6s is halted in rotation due to the clutch Cs remained engaged. That is, upon causing the brake Bs to suitably engage or disengage under such a state mentioned above, the stator wheel 6s of the torque converter 6 can be operative in the same mode as that in which the related art torque converter is caused to operate. More particularly, with the torque converter 6 remained in the torque converting range, for instance, causing the brake Bs to engage (to be connected) allows a flow of working oil in the torque converter 6 to vary with a resultant increase in torque. With a coupling range, moreover, causing the brake Bs to disengage (to be disconnected) allows the stator wheel 6s to freewheel to function as a fluid coupling. In addition, causing the brake Bs to disengage at all times results in a consequence with the torque converter 6 rendered operative in the same mode as that of the fluid coupling.

Moreover, causing the clutch Cs to suitably engage (involving a slipping engagement) or disengage with the clutch Ci caused to disengage while the brake Bs remains engaged results in the third mode. Engaging the clutch Cs allows the brake Bs to engage such that the stator wheel 6s is halted in rotation. That is, properly engaging or disengaging the clutch Cs under such a state mentioned above enables the stator wheel 6s of the torque converter 6 to operate in the same mode as that of a stator of the related art torque converter. More particularly, with the torque converter 6 remaining in, for instance, the torque converting range, engaging (connecting) the clutch Cs allows the flow of working oil in the torque converter 6 to vary with a resultant increase in torque. With the coupling range, moreover, disengaging (disconnecting) the clutch Cs allows the stator wheel 6s to freewheel to serve as the fluid coupling. In addition, disengaging the clutch Cs at all times results in a consequence with the torque converter 6 rendered operative in the same manner as that of the fluid coupling.

With the present embodiment, besides, intervening the planetary gear set 182 allows the drive force of the electric motor 10 to be output in torque conversion via the planetary gear set 182. That is, even if the electric motor 10 has a small output, it becomes possible to allow the planetary gear set 182 to perform torque multiplication to output a given drive force. This makes it possible to achieve the miniaturization of the electric motor 10.

With the present embodiment, as set forth above, even if the vehicular drive apparatus 180 takes the form of such a structure noted above, executing the present control results in the same advantageous effects as those of the previous embodiments. In addition, intervening the planetary gear set 182 allows the various rotary elements of the same to be connected in a manner as described above. Therefore, the output torque of the electric motor 10 can be subjected to torque conversion by means of the planetary gear set 182. This enables the electric motor 10 to be further miniaturized in structure.

While the embodiments of the present invention have been described above in detail with reference to the accompanying drawings, the present invention may be applied in other modes.

With the illustrated embodiments previously mentioned above, for instance, while the step-variable type automatic transmission 8 is provided with the vehicular drive apparatus 7 in its downstream side, the automatic transmission 8 is construed not to be limited to the transmission of the step-variable type and it doesn't matter if the automatic transmission 8 is comprised of a continuously variable transmission such as, for instance, a belt type continuously variable transmission. That is, with the present invention, the transmission may take a structure that can be freely modified within a range with no contradiction.

Further, although the various embodiments have been described above to be independent from each other, it doesn't matter if the present invention is implemented in combination of these embodiments.

Furthermore, the vehicular drive apparatus 180 of the present embodiment described above is construed not to be limited to a particular connecting relationship of the planetary gear set 182 and it doesn't matter if the vehicular drive apparatus 180 further includes a plurality of planetary gear sets or a planetary gear set of a double pinion type.

In the illustrated embodiments, moreover, although the demanded drive force has been calculated based on the accel-opening Acc and the vehicle speed V, it doesn't matter if the demanded drive force is calculated based on a throttle valve opening $\theta_{TH}$ in place of the accel-opening Acc.

In the illustrated embodiments, besides, although the control of the electric motor 10 is executed in the feedback control or the feed forward control, it doesn't matter if the electric motor 10 is controlled in another method such as, for instance, a timer control or the like.

In the illustrated embodiments, further, although the brake Bs has been provided, it is possible to obtain an adequate advantageous effect even in the absence of the third mode and, hence, it is not necessary to provide the brake Bs.

It is intended that the embodiments described be considered only as illustrative of the present invention and that the present invention may be implemented in various modifications and improvements in the light of knowledge of those skilled in the art.

The invention claimed is:

1. A control device for a vehicular drive apparatus, comprising:
    a torque converter having a pump wheel, a turbine wheel and a stator wheel rotatably disposed between the turbine wheel and the pump wheel;
    an electric motor operative to drive and/or apply a brake to the stator wheel;
    a first connecting/disconnecting portion configured to connect/disconnect the electric motor and the stator wheel to and from each other;
    a second connecting/disconnecting portion configured to connect/disconnect the electric motor and an output shaft to and from each other; and
    mode switching portion configured to switch to either one of a first mode in which the first connecting/disconnecting portion is held in a connecting state to allow the electric motor to control a rotating state of the stator wheel and a second mode in which the second connecting/disconnecting portion is held in a connecting state to enable the electric motor to perform power running and regeneration, depending on a running condition of a vehicle.

2. The control device for the vehicular drive apparatus according to claim 1, wherein the mode switching portion switches the modes to either one of the first and second modes depending on an allowable rotation speed of the electric motor.

3. The control device for the vehicular drive apparatus according to claim 2, wherein the mode switching portion switches the modes to the first mode when a rotation speed of the turbine wheel is higher than the allowable rotation speed of the electric motor.

4. The control device for the vehicular drive apparatus according to claim 2, wherein the mode switching portion switches the modes to the second mode when a rotation speed of the turbine wheel is lower than the allowable rotation speed of the electric motor.

5. The control device for the vehicular drive apparatus according to claim 1, wherein the mode switching portion switches the modes to either one of the first and second modes depending on a demanded drive force of the vehicle.

6. The control device for the vehicular drive apparatus according to claim 5, wherein the mode switching portion switches the modes to either one of the first and second modes based on a comparison between the demanded drive force of the vehicle and an output of the electric motor.

7. The control device for the vehicular drive apparatus according to claim 6, further comprising:
    fuel consumption-amount calculating portion configured to calculate fuel consumption amounts for the first and second modes to be switched, respectively; and
    fuel consumption-amount comparing portion configured to compare the fuel consumption amounts in magnitude relation; wherein
    when the demanded drive force of the vehicle is greater than the output of the electric motor, the mode switching portion switches the modes to a mode involved in a lower fuel consumption amount determined by the fuel consumption-amount comparing portion.

8. The control device for the vehicular drive apparatus according to claim 6, wherein
    when the demanded drive force of the vehicle is less than the output of the electric motor, the mode switching portion switches the modes to the second mode.

9. The control device for the vehicular drive apparatus according to claim 1, wherein the mode switching portion switches the modes to either one of the first and second modes depending on a state of charge of a battery from which electric power is supplied to the electric motor.

10. The control device for the vehicular drive apparatus according to claim 9, wherein:
    when the state of charge of the battery is less than a given threshold value;

the mode switching portion switches the modes to either one of the first and second modes depending on an engaging state of a lock-up clutch provided in the torque converter.

11. The control device for the vehicular drive apparatus according to claim 9, further comprising:
   an electric-motor operating time calculating portion configured to calculate operating times of the electric motor for the first and second modes to be switched; and
   an electric-motor operating time comparing portion configured to make a comparison between the operating times in magnitude relation; wherein
   when the state of charge of the battery is larger than a given threshold value, the mode switching portion switches the modes to an appropriate mode based on the comparison between the operating times of the electric motor.

12. The control device for the vehicular drive apparatus according to claim 1, further comprising:
   third connecting/disconnecting portion configured to connect/disconnect the stator wheel and a fixed member to and from each other; wherein
   the mode switching portion switches the modes further to a third mode in which the third connecting/disconnecting portion is held in a connecting state to allow the stator wheel to be placed in a halted condition, depending on the running condition of the vehicle.

13. The control device for the vehicular drive apparatus according to claim 12, wherein:
   a planetary gear set is interposed between the torque converter and the electric motor; and
   the planetary gear set includes three rotary elements in the form of a first rotary element, a second rotary element and a third rotary element; wherein
   the first rotary element is connected to the stator wheel via the first connecting/disconnecting portion;
   the first rotary element is connected to the fixed member via the third connecting/disconnecting portion;
   the second rotary element is connected to the output shaft via the second connecting/disconnecting portion; and
   the third rotary element is connected to the electric motor.

* * * * *